US011002616B2

(12) United States Patent
Jackson et al.

(10) Patent No.: US 11,002,616 B2
(45) Date of Patent: May 11, 2021

(54) SYSTEMS AND METHODS FOR MONITORING FOOD PROCESSING AND FOOD STORAGE

(71) Applicant: CHECKIT LIMITED, Cambridge (GB)

(72) Inventors: Martin Kirk Jackson, Essex (GB); Paul James Young, Essex (GB); Michael Thomas Cimelli, Cambridge (GB); Martin James Nash, Cambridgeshire (GB); Brian Noel Reid, Hertfordshire (GB)

(73) Assignee: CHECKIT EUROPE LIMITED

( * ) Notice: Subject to any disclaimer, the term of this patent is extended or adjusted under 35 U.S.C. 154(b) by 636 days.

(21) Appl. No.: 15/565,541

(22) PCT Filed: Apr. 8, 2016

(86) PCT No.: PCT/EP2016/057859
§ 371 (c)(1),
(2) Date: Oct. 10, 2017

(87) PCT Pub. No.: WO2016/162545
PCT Pub. Date: Oct. 13, 2016

(65) Prior Publication Data
US 2018/0120169 A1    May 3, 2018

(30) Foreign Application Priority Data

Apr. 10, 2015 (GB) ...................... 1506119

(51) Int. Cl.
*G01K 13/00* (2021.01)
*G01K 15/00* (2006.01)
(Continued)

(52) U.S. Cl.
CPC ........... *G01K 13/00* (2013.01); *G01K 15/005* (2013.01); *G06Q 10/00* (2013.01);
(Continued)

(58) Field of Classification Search
CPC ............ G01K 1/024; G01K 1/08; G01K 1/16; G01K 13/00; G01K 15/005; G06Q 50/12;
(Continued)

(56) References Cited

U.S. PATENT DOCUMENTS

| 5,900,801 A | 5/1999 | Heagle et al. |
| 7,026,929 B1 | 4/2006 | Wallace |

(Continued)

FOREIGN PATENT DOCUMENTS

| CN | 101087218 A | 12/2007 |
| WO | 2005/013101 A2 | 2/2005 |
| WO | 2012/170344 A2 | 12/2012 |

OTHER PUBLICATIONS

Ranjani, Secured Data Integrity Routing for Wireless Sensor Network (Year: 2014).*

(Continued)

*Primary Examiner* — Michael P Nghiem
*Assistant Examiner* — Dacthang P Ngo
(74) *Attorney, Agent, or Firm* — Tarolli, Sundheim, Covell & Tummino LLP

(57) ABSTRACT

A cloud-based system for monitoring food storage/processing comprising at least one fixed sensor to collect fixed location environment data; at least one handheld sensor to collect mobile location environment data; and a remote monitoring and reporting system to collect the fixed and remote location environment data and to audit the collected data. A portable device comprises a processor configured to: receive the mobile location environment data; and transmit an auditable version of the received mobile location envi- (Continued)

ronment data to the remote system. A hub device comprising a processor configured to: receive the fixed location environment data; and transmit an auditable version of the fixed location environment data. The monitoring and reporting system is configured to determine whether the version of the environment data indicates that the monitored environment is operating within the bounds of a model defining correct operation of a food process and to output an alert if necessary.

16 Claims, 15 Drawing Sheets

(51) Int. Cl.
| | |
|---|---|
| H04L 29/06 | (2006.01) |
| G06Q 10/00 | (2012.01) |
| G06Q 10/06 | (2012.01) |
| H04W 4/029 | (2018.01) |
| H04L 29/08 | (2006.01) |
| H04W 4/80 | (2018.01) |
| H04W 84/12 | (2009.01) |
| H04W 4/02 | (2018.01) |

(52) U.S. Cl.
CPC ... *G06Q 10/06395* (2013.01); *H04L 63/0428* (2013.01); *H04W 4/029* (2018.02); *H04L 67/10* (2013.01); *H04W 4/02* (2013.01); *H04W 4/80* (2018.02); *H04W 84/12* (2013.01)

(58) Field of Classification Search
CPC ..... H04L 12/28; H04L 63/0428; H04L 67/10; H04W 4/02; H04W 4/029; H04W 4/80; H04W 84/12
See application file for complete search history.

(56) References Cited

U.S. PATENT DOCUMENTS

| | | | |
|---|---|---|---|
| 8,600,693 | B1* | 12/2013 | Kennamer .......... G01K 15/005 374/1 |
| 2002/0098870 | A1* | 7/2002 | Kashiwagi ............ H04W 16/14 455/561 |
| 2005/0261991 | A1 | 11/2005 | Kennamer |
| 2012/0105201 | A1 | 5/2012 | Sanders |
| 2013/0041755 | A1 | 2/2013 | Ivanov et al. |
| 2013/0169443 | A1 | 7/2013 | Schechter |
| 2014/0200840 | A1 | 7/2014 | Cox |
| 2015/0355036 | A1* | 12/2015 | Giorgi ................. H04L 12/2825 702/130 |
| 2016/0007288 | A1* | 1/2016 | Samardzija ....... H04W 52/0229 370/311 |

OTHER PUBLICATIONS

Csgnework, Water Altitude Boiling Point Calculator (Year: 2003).*
International Dairy-Deli-bakery Association, Digital Thermometer Calibration (Year: 2013).*
Alberta Health Services, Thermometer Calibration (Year: 2011).*
Combined Search and Examination Report for Application No. GB 1506119.5 dated Oct. 29, 2015.
International Search Report for Application No. PCT/EP2016/057859 dated Aug. 23, 2016.
Anonymous: 11 Cheek it takes food safety monitoring into the cloud : Elektron Technology, Feb. 11, 2015 (Feb. 11, 2015), XP055280132.
Anonymous: Search : El ektron Technology, Sep. 29, 2014 (Sep. 29, 2014), XP055280135.
Malcolm Kane et al: Taking the Pain out of HACCP, Sep. 29, 2014 (Sep. 29, 2014), XP055280136.

* cited by examiner

| Date | Time | User | Menu Task | Item | Reading °C | Min °C | Max °C | Corrective Action |
|---|---|---|---|---|---|---|---|---|
| 15/10/2014 | 10:01:46 | Martin H. Nash | Hot Food Checks | Beef Medium Rare | 80.0 | 45.0 | 80.0 | PASS |
| 15/10/2014 | 10:01:51 | Martin H. Nash | Hot Food Checks | Chicken | 80.0 | 85.0 | 85.0 | PASS |
| 15/10/2014 | 10:01:57 | Martin H. Nash | Hot Food Checks | Pork | 80.0 | 75.0 | 85.0 | Waste Product |
| 15/10/2014 | 10:02:03 | Martin H. Nash | Hot Food Checks | White Fish | 80.0 | 80.0 | 80.0 | Waste Product |
| 15/10/2014 | 10:02:09 | Martin H. Nash | Fridge 1 | Mayo Qty | | | | 1 in stock |
| 15/10/2014 | 10:02:32 | Martin H. Nash | Fridge 1 | Mayo Use-By | | | | 2 days left |
| 15/10/2014 | 10:02:32 | Martin H. Nash | Fridge 1 | Duck Plate Qty | | | | 5-10 in stock |
| 15/10/2014 | 10:02:35 | Martin H. Nash | Fridge 1 | Duck Plate Use-By | | | | 2 days left |
| 15/10/2014 | 10:02:37 | Martin H. Nash | Fridge 1 | Bacon Qty | | | | Out of stock |
| 15/10/2014 | 10:02:39 | Martin H. Nash | Fridge 1 | Bacon Use-By | | | | 3-7 days left |
| 15/10/2014 | 10:02:12 | Martin H. Nash | Fridge 2 | Steak Qty | | | | 1 in stock |
| 15/10/2014 | 10:02:14 | Martin H. Nash | Fridge 2 | Steak Use-By | | | | 1 days left |
| 15/10/2014 | 10:02:16 | Martin H. Nash | Fridge 2 | Chkn Fillet Qty | | | | 2-5 in stock |
| 15/10/2014 | 10:02:19 | Martin H. Nash | Fridge 2 | Chkn Fillet Use-By | | | | 3-7 days left |
| 15/10/2014 | 10:02:21 | Martin H. Nash | Fridge 2 | Scampi Qty | | | | Out of stock |
| 15/10/2014 | 10:02:23 | Martin H. Nash | Fridge 2 | Scampi Use-By | | | | No product in stock |
| 15/10/2014 | 17:31:28 | Martin H. Nash | Closing Checks | Clean work surfaces | | | | OK, no action req'd |

Fig. 14

SYSTEMS AND METHODS FOR MONITORING FOOD PROCESSING AND FOOD STORAGE

RELATED APPLICATIONS

The present invention is a U.S. National Stage under 35 USC 371 patent application, claiming priority to Serial No. PCT/EP2016/057859, filed on 8 Apr. 2016; which claims priority of GB 1506119.5, filed on 10 Apr. 2015, the entirety of both of which are incorporated herein by reference.

FIELD OF THE INVENTION

The invention relates to a distributed, cloud-based system for monitoring/auditing food and other processing.

BACKGROUND TO THE INVENTION

Hazard Analysis and Critical Control Point (HACCP) is a system that helps food business operators look at how they handle food and introduces procedures to ensure that food is safe to eat. It is important for business operators to follow the HACCP system to reduce the risk of food poisoning, to obey the law and protect their business's reputation. The system requires checking that cross-contamination is minimised, that surfaces where foods are stored and prepared are clean, that foods are stored in chiller cabinets, refrigerators and freezers at the correct (safe) temperature, and to ensure that foods are cooked at the correct (safe) temperature, to prevent bacteria from spreading or reproducing.

FIG. 1 shows a prior art system for performing checks and compiling reports. The system 100 (also known as "Checkit") comprises a plurality of modular system components which work together to provide fast and easy food safety monitoring and to simplify HACCP reports. An outline of the system is provided here: http://www.checkit.net/system-at-a-glance/. The system 100 comprises one or more fixed sensors 102, which are smart, wireless sensors installed in a particular environment to continuously monitor variables such as temperature, humidity, and door open/close status. One or more fixed sensors communicate with a receiver 104, which receives the data collected by each fixed sensor 102. The one or more sensors 102 preferably transmit data to a receiver 104 via wireless means, since a single receiver 104 may be positioned in an area containing multiple fixed sensors. The receiver 104 is coupled to a hub 108. The hub 108 is configured to collate all the data received by the receiver 104 from the one or more fixed sensors. The one or more fixed sensors 102 transmits sensor data to the receiver 104 either directly (as shown by the black arrow) if the fixed sensor is close enough to the receiver 104 to communicate with it wirelessly, or indirectly via a repeater 106 (as shown by the dashed arrow), if the fixed sensor 102 is too far away from the receiver 104 to communicate with it wirelessly. Each fixed sensor 102 automatically collects and transmits readings to the hub 108 every few minutes via the receiver 104 (and optionally, via the repeater 106). This generates a continuous stream of data which may record, for example, whether or not a freezer is operating within the required optimum temperature range.

The system 100 comprises a handheld sensor 110 which is a smart, wireless sensor that comprises a temperature probe 112. The handheld sensor 110 enables users to perform checks and monitor storage and holding temperatures quickly. The probe 112 may be detachable such that without the probe attached, the handheld device 110 becomes a multi-purpose action logger. Temperature data collected by the handheld sensor 110 can be wirelessly transmitted to the hub 108.

The hub 108 acts as the on-site gateway for the system 100, and is configured to receive and store the data from the fixed sensors 102 and the handheld sensors 110. The hub 108 may be any computing device such as a PC, laptop computer, tablet computer, etc., which is configured for this function, or alternatively, the hub 108 is a purpose-built device. For example, the hub 108 may be a flat panel touchscreen device that is a modular component of the system 100 and is designed to be used with the other modular components (e.g. the sensors). The hub 108 is configured to run web-based software that enables users to set up their own HACCP procedures. The graphic interface of the software alerts users to any issues requiring their attention, such as, for instance, a refrigerator that is not working within the required temperature range. The hub 108 may be configurable to send alerts to a user's PC, tablet or smartphone as soon as data indicating a problem is received from a fixed sensor or handheld sensor. The hub 108 automatically stores and organises data received from the fixed and handheld sensors, to provide an accurate log of the user's food safety and hygiene processes. Data is also automatically transmitted from the hub 108 to the cloud 114 for secure storage and remote access.

However, a problem with the system of FIG. 1 is that it uses a PC-based monitoring and reporting system. Furthermore, the system is expensive to implement, and particular components of the system are limited in their functionality. In addition improvements in system robustness and the reliability of data transfer are generally desirable, and it would be advantageous if collected data could be independently verified.

Webpages accessible at http://www.elektron-technology.com/en-gb/news/checkit-takes-food-safety-monitoring-cloud and http://www.checkit.net/wp-content/uploads/2015/10/Taking-the-Pain-out-of-HACCP.pdf refer to the prior art system described above.

Further background art can be found in US2005/261991, CN101087218, U.S. Pat. Nos. 7,026,929, 5,900,801, and US2013/169443.

The present applicant has thus recognised the need for an improved system to perform checks, store data and compile reports.

SUMMARY OF THE INVENTION

According to a first aspect of the present invention, there is provided a cloud-based system for monitoring food processing, the system comprising: at least one fixed sensor for installation in an environment to be monitored, wherein the at least one fixed sensor is configured to collect fixed location environment data relating to the monitored environment; at least one handheld sensor for a user to collect mobile location environment data relating to the monitored environment; a remote monitoring and reporting system located remote to the monitored environment, to collect the fixed location environment data and the mobile location environment data from the fixed sensor and handheld sensor respectively; a portable device comprising a processor configured to: receive the mobile location environment data from the or each handheld sensor; and transmit a version of the received mobile location environment data to the remote system, wherein the version of the mobile location environment data is generated by the or each handheld sensor and/or the portable device; a hub device for installation within the monitored environment, wherein the hub device comprises a processor configured to: receive fixed location environment data from the at least one fixed sensor; and transmit a version of the fixed location environment data sensed data to the remote system, wherein the version of the fixed location environment data is generated by the or each fixed sensor and/or the hub device; wherein the monitoring and reporting system is configured to receive the version of the fixed location and mobile location environment data, to determine whether the version of the environment data indicates that the monitored environment is operating within the bounds of a model defining correct operation of a food process within the environment, and to output an alert if the version of the environment data indicates operation of said process within the monitored environment outside permitted bounds of said model.

In embodiments the model may comprise a logical behaviour model of the process or of an aspect or element or the process, as described further later. Thus sensor (or user) data indicating that the process is outside the bounds of correct operation as defined by the model may be classed as an error or "fault". The system may output an alert in such a situation; the alert may comprise, for example, an electronic signal and/or data or more generally any means of alerting a user/operator of the system to the detected condition. In embodiments of the system the model is a dynamic model, that is it includes one or more time-dependent elements or rules. In some preferred implementations the model is a distributed model, as described later. In embodiments inputs to the logical behaviour model may include user data, such as checklist data, as well as sensor data.

Preferably the system includes a mechanism for auditing the monitoring. In embodiments this provides a mechanism for demonstrating the origin of collected data, for example to a third party responsible for checking compliance with a defined process or model, and may also demonstrate that the data has not been tampered with to provide verifiable data provenance. This is described further later.

Thus in embodiments the processor of the portable device is configured to transmit an auditable version of the received mobile location environment data to the remote system, the auditable version of the mobile location environment data being generated by the or each handheld sensor and/or the portable device. Similarly in embodiments the processor of the hub device is configured to transmit an auditable version of the fixed location environment data sensed data to the remote system, auditable version of the fixed location environment data being generated by the or each fixed sensor and/or the hub device. In embodiments the monitoring and reporting system is configured to receive the auditable version of the fixed location and mobile location environment data, and to non-repudiably determine if the auditable version of the environment data indicates that the monitored environment is operating correctly, such that said monitoring and reporting system audits the collected data as coming from the fixed sensor and the handheld sensor, for providing the aforementioned alert.

In embodiments the auditable version of the mobile location environment data comprises a version processed using a secret value associated with the handheld sensor, such that the auditable version of the mobile location environment data is verifiable as originating from the handheld sensor. Similarly in embodiments the auditable version of the fixed location environment data comprises a version processed using a secret value associated with the fixed sensor, such that the auditable version of the fixed location environment data is verifiable as originating from the fixed sensor.

According to a related aspect of the invention, there is provided a method for auditing food processing in a cloud-based monitoring system, the method comprising: receiving, from at least one fixed sensor, fixed location environment data relating to an environment to be monitored; receiving, from at least one handheld sensor, mobile location environment data relating to the monitored environment; collecting, using a remote monitoring and reporting system located remote to the monitored environment, the fixed location environment data and the mobile location environment data from the fixed sensor and handheld sensor respectively, auditing the collected data as coming from the fixed sensor and the handheld sensor; transmitting an auditable version of the received mobile location environment data to the remote system; and transmitting an auditable version of the fixed location environment data sensed data to the remote system; wherein the monitoring and reporting system is configured to: receive the auditable version of the fixed location and mobile location environment data, non-repudiably determine if the auditable version of the environment data indicates that the monitored environment is operating correctly, and output an alert if the auditable version of the environment data indicates an error within the monitored environment; wherein the auditable version of the mobile location environment data comprises a version processed using a secret value associated with the handheld sensor, such that the auditable version of the mobile location environment data is verifiable as originating from the handheld sensor; and wherein the auditable version of the fixed location environment data comprises a version processed using a secret value associated with the fixed sensor, such that the auditable version of the fixed location environment data is verifiable as originating from the fixed sensor.

Generally speaking, embodiments of the above described systems and methods provide a cloud-based and user-friendly monitoring system for auditing food processing conditions. In broad terms the food processing may include any aspect of food processing in the supply chain "from field to fork" including, but not limited to: food generation, food preparation, food storage (food storage as used herein is a form of food processing, and monitoring food processing conditions includes monitoring food storage conditions), food transport, food handling, and food serving. As described further later, the technical architecture of the system may also be applied to related technical problems in different application domains. Some preferred embodiments of the above described systems and methods include at least one fixed sensor and at least one handheld sensor but this is not essential and one or other of these (and the associated respective hub/portable device) may be omitted.

In what follows we refer to the system for convenience but the skilled person will appreciate that the described features also apply to embodiments of the above described methods.

In preferred embodiments the system comprises modular components which are configured to work together to enable an environment to be monitored. The term 'environment' used herein refers to any area, site or space in which food is stored and/or prepared, and thus, where food safety procedures must be in place. The term encompasses restaurants, canteens, kitchens, factories, supermarkets and shops selling food products, warehouses storing food products, and vehicles used to deliver food products (e.g. the refrigerated vans used to deliver groceries). Users of the monitoring system are prompted to perform particular tasks to comply with the food safety procedures for a particular environment, where the performance of the task (and any data collected thereby) are stored electronically within the system. Furthermore, any data collected by performing the tasks is appended with provenance data in order to track the origin and authenticity of the data. The system enables this data to be stored in a central, cloud-based data store, where it can be accessed at any time.

The term 'cloud' used herein refers to a network of remote servers hosted on the internet and used to store, manage and process data in place of local servers or personal computers.

The environment data collected by the fixed sensor and/or the mobile sensor may be any type of variable which can be monitored or sensed, including, but not limited to, temperature, humidity, light, pressure, etc.

In embodiments, the portable device generates the auditable version of the mobile location environment data by adding a timestamp to the received mobile location environment data. Similarly, in embodiments, the hub device generates the auditable version of the fixed location environment data by adding a timestamp to the fixed mobile location environment data.

In embodiments, the portable device generates the auditable version of the mobile location environment data by adding a checksum to the received mobile location environment data, and wherein the hub device generates the auditable version of the fixed location environment data by adding a checksum to the fixed mobile location environment data. The checksum may be an MD5 checksum.

Advantageously, data from the sensors is appended with information by each node that handles the data, in order to establish a 'chain of custody' and establish the provenance of the data. The checksum, for example, could be used to establish that the sensor data has not been tampered with as it is transmitted through the system to the cloud-based storage.

In embodiments, the auditable version of the fixed location environment data and the auditable version of the mobile location environment data is encrypted by the hub device and portable device respectively before being transmitted to the remote monitoring and reporting system. Advantageously, this provides additional security within the system. Any known encryption techniques may be used to encrypt the environment data.

In embodiments, the or each handheld sensor transmits mobile location environment data to the portable device via a wireless communication protocol, such as Bluetooth, Wi-Fi, or ZigBee.

In embodiments, the or each fixed sensor transmits fixed location environment data to the hub device via a wireless communication protocol, such as Bluetooth, Wi-Fi, or ZigBee.

In some networks, such as ZigBee, a central node evaluates the best set of frequencies to use without reference to other potentially useful information. Failure to take other users of the radio frequency spectrum into account may result in poor overall network performance. In a ZigBee network, the entire network usually operates at a single frequency which is determined by the central node. The central node scans the available radio frequency (RF) channels available and decides which one to use. This process runs the risk that a remote node in the network, whether accessed directly or through a repeater, could be forced to use an unsuitable channel because it is in use by another wireless entity in the network.

Thus, in embodiments, the present system comprises nodes (e.g. sensors, portable devices, repeaters, etc.) in the network which are capable of reporting its local environment by running a channel scan and reporting back to the central node (e.g. the hub device/gateway) what it sees. For example, a node may report the background RF energy in a channel. Furthermore, the present system comprises a central node which is configured to gather hints from other wireless interfaces that are connected to the other devices in the network. For example, a repeater may have additional wireless interfaces (such as ZigBee, Bluetooth and Wi-Fi). The central node software is configured to query the wireless interfaces for information about the RF spectrum usage of those devices. For example, a Wi-Fi device could report back to the central node what local Wi-Fi channel usage the device sees. The central node is further configured to use these pieces of information and combine them with the RF characteristics of the scanned devices to determine the best possible (optimum) frequency to use for its service.

In embodiments, the hub is configured to communicate using one or more of the Bluetooth, Wi-Fi and ZigBee communication protocols, and the hub processor is configured to optimise data transfer in the system by:
  performing radio frequency scan and determine which radio frequency band is not in use; and
  selecting a radio frequency band to communicate with the or each fixed sensor to reliably transfer data from the or each fixed sensor to the hub.

The terms 'optimise', 'optimum' and 'optimal' used herein in relation to the frequency of data transmission/data transfer in the system means that the frequency is that which provides maximum data throughput, and/or maximum data transmission reliability. This may not necessarily be the fastest frequency.

In embodiments, the hub processor is further configured to output radio network configuration data defining a radio network configuration for optimising data transfer in the system. For example, the hub processor may output the information gathered by the hub to an operator, and/or output a suggestion to an operator, such that the system operator is able to make a determination that the radio network performance may be improved by implementing a change in the network configuration such as, for instance, splitting a single frequency ZigBee network into a multi-frequency network. Such an approach may be employed in the system independently of other aspects of the system, in particular independently of whether or not a logical behaviour model or auditing mechanism is implemented.

In embodiments, the portable device comprises a display screen and is configured to display a task to prompt a user to collect mobile location environment data relating to the monitored environment; and
  the or each handheld sensor comprises an identifier to indicate sensor type, wherein the handheld sensor transmits the identifier to the portable device;
  wherein the portable device processor is further configured to receive the identifier, and determine if the sensor type matches the sensor type required to perform the displayed task, wherein if the sensor type does not match, the portable device outputs a warning.

In embodiments, the or each fixed sensor is configured to collect fixed location environment data relating to the monitored environment at regular intervals. The intervals may be every n seconds, n minutes, and/or n hours, where n is any positive integer. For example, where the fixed sensor is a temperature sensor, the fixed location temperature data may be collected around every 1 to 10 minutes; different sensor types may collect and report at these or different intervals.

In embodiments, the or each fixed sensor is configured to substantially continuously collect fixed location environment data relating to the monitored environment, preferably every 1 to 5 seconds.

In embodiments, the hub device and the portable device are configured to store the auditable version of the fixed location and mobile location environment data respectively, until the auditable version of the environment data has been received by the remote monitoring and reporting system. Additionally, the sensors may be configured to retain, in their internal memories, all measured environment data until they receive confirmation that the data is securely lodged in a remote database. Advantageously, data storage is deemed more robust since there is no single point of failure within the network that can affect more than one component in the network.

In embodiments, one or both of a handheld sensor and a fixed sensor is a humidity sensor. In embodiments, a fixed sensor may sense whether a refrigerator or freezer door is open or closed. In embodiments, one or both of a handheld sensor and a fixed sensor is a temperature sensor. The skilled person will appreciate that many other types of sensor may be employed; some further examples are listed later.

Preferably, the temperature sensor has a factory calibration defined by factory calibration data, and the system further comprises code to:
validate the temperature sensor by monitoring a deviation in the factory calibration over time by monitoring a sensed temperature of the temperature sensor in boiling water, wherein the monitoring of the deviation over time is performed for a substantially constant height of the temperature sensor above sea level; and
storing or outputting sensor validation data dependent upon the validation.

Preferably, the system further comprises code to adjust the factory calibration by:
inputting a height above sea level of the temperature sensor;
inputting a reference sensed value from the temperature sensor when the temperature sensor is in boiling water at the inputted height;
adjusting the factory calibration dependent upon the reference sensed value and the inputted height.

In a related aspect of the invention there is provided a carrier carrying code which, when implemented on a processor, causes the processor to carry out the methods described herein.

The or each processor may be implemented in any known suitable hardware such as a microprocessor, a Digital Signal Processing (DSP) chip, an Application Specific Integrated Circuit (ASIC), Field Programmable Gate Arrays (FPGAs), or the like. The or each processor may include one or more processing cores with each core configured to perform independently. The or each processor may have connectivity to a bus to execute instructions and process information stored in, for example, a memory.

The invention further provides processor control code to implement the above-described systems and methods, for example on a general purpose computer system or on a digital signal processor (DSP). The invention also provides a carrier carrying processor control code to, when running, implement any of the above methods, in particular on a non-transitory data carrier—such as a disk, microprocessor, CD- or DVD-ROM, programmed memory such as read-only memory (Firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate such code and/or data may be distributed between a plurality of coupled components in communication with one another. The invention may comprise a controller which includes a microprocessor, working memory and program memory coupled to one or more of the components of the system.

According to a further aspect of the invention, there is provided a wireless temperature sensor for use with a cloud-based temperature monitoring system, the sensor comprising:
a (single) circuit board bearing a radio for radio-frequency (RF) communication of sensed temperature data, the radio having an antenna, and a temperature sensor, and
a plastic housing enclosing the circuit board, wherein the plastic housing is bevelled at one corner or edge; and
a compressible thermal coupling substance compressed between the bevelled corner or edge and the temperature sensor;
wherein the antenna of the radio is displaced away from the bevelled corner or edge.

The housing comprises a bevelled, chamfered, or angled corner/edge which performs at least two functions. Firstly, the bevelled edge provides a visual indication of the preferred orientation of the sensor, since the temperature sensor is located in the housing close to the bevelled edge. Secondly, the bevelled edge allows the internal temperature sensor to be placed in closer proximity to the outside of the housing, which enables more accurate temperature measurements to be made. The radio antenna requires a certain amount of space between it and the plastic housing, to prevent/minimise detuning by the plastic housing. In contrast, the gap between the sensor and the housing needs to be as small as possible, since the thermal conductivity of air is low, meaning that a large air gap between the housing and the sensor may result in inaccurate temperature readings. Thus, the gap between the radio and the plastic housing needs to larger than the gap between the housing and the sensor, and a bevelled corner/edge in the housing provides a solution to this problem. The small gap between the plastic housing and the temperature sensor may be filled with a compressible thermal coupling material, which has a higher thermal conductivity than air. The material is preferably compressible for manufacturing ease.

In embodiments, the bevelled corner or edge is a bevelled corner, wherein the antenna is a near field communication (NFC) antenna, and wherein the plastic housing comprises Acrylonitrile butadiene styrene (ABS).

According to a further aspect of the invention, there is provided a cloud-based system for monitoring process conditions, the system having a hierarchy of data capture/processing levels, the system comprising: a first hierarchy level comprising at least one sensor at for use in a food storage environment to be monitored, wherein the at least one sensor is configured to capture environment data relating to the monitored environment; a second hierarchy level comprising a gateway device coupled to the at least one sensor; and a third hierarchy level comprising a cloud-based monitoring and reporting system located remote to the monitored environment, to store the environment data; wherein the system comprises code defining a logical behaviour model defining the behaviour of an entity in said food storage environment; and wherein said logical behaviour model includes code defining behavioural rules of said entity to model said entity behaviour; wherein said rules are distributed across at least a first two of said hierarchy levels; and wherein said rules are configured to operate upon collected data including said environment data from said first hierarchy level and second input data; and wherein the system is configured to apply said distributed rules of said logical behaviour model to said collected data to monitor said food storage conditions.

Embodiments of such a system provide a number of advantages. One advantage is that the system effectively provides distributed storage so that an element in the system can fail and the probability of losing data is very small. Furthermore broadly speaking embodiments of this structure enable a rule-based approach to be applied to monitoring the behaviour of a range of different entities in a flexible manner. For example, rather than merely checking whether, say, the internal temperature of a refrigerator is correct the system can employ a model of the refrigerator to determine whether or not the refrigerator is operating correctly. In this way, for example, the system is robust against a momentary increase in temperature which may be caused by opening the fridge door but can detect potentially even predict failure or progressive failure of the fridge compressor. Such a model-based approach may be applied to a range of different monitored entities including, but not limited to, a refrigerator (which here includes similar devices such as a freezer, chiller cabinet and the like), a 'hot hold' food counter, and even to monitoring the behaviour of a human operator, for example based on a user-collected measurement such as a temperature measurement or bar code scan in combination with other user-input data, for example inputting data defining whether or not one or more of a series of workflow tasks has been performed.

Some preferred embodiments of the system are used for monitoring food storage, handling, transport, preparation and/or serving conditions for a food processing environment. Preferred embodiments of the system provide non-repudiation; more particularly they capture and process data non-repudiably so that the correct process behaviour can be audited by a third party. In embodiments this may be achieved by providing a system to allow each level of the hierarchy/each link in the chain to add a non-repudiable attachment to the data identifying that the data passed through that level of the hierarchy/link in the chain. Optionally where data is added at a level of the hierarchy/link in the chain a time stamp and/or encrypted (secret) value may also be added to validate the data, for example an MD5 checksum.

In embodiments of the system data is sensed at least the lowest level of the system (the transducer/handheld device level) and additional data relating to the monitored environment is collected from the second and/or third levels of the system (hub/gateway and/or cloud server); this second data may comprise further sensor data and/or, in preferred embodiments, user data, that is data generated either by a user triggered event or by user input data.

As described above, rules are distributed across at least two of the hierarchy levels, for example, at the second level in the hub/gateway and in the cloud. In the latter case the cloud-based monitoring and reporting system may comprise a server coupled to a time series database, these entities applying one or more further rules to the captured data. Storing data in a time series database facilitates application of time-based rules for the behaviour model; this approach facilitates the application of relatively simple rules in the context of monitoring through the storage conditions over time.

In embodiments the third hierarchy level may be coupled to devices at lower levels in multiple different monitored environments, for example different sites. Preferably then the third hierarchy level includes processor control code to enable a comparison between different environments/sites, for example to determine and compare degrees of compliance with the same logical behaviour model across the different environments/sites, and hence to flag environments/sites which are performing less well than others. Thus in embodiments a logical behaviour model is able to identify whether or not a correct process is being/has been employed. In embodiments a logical behaviour model may include user input data as well as sensor input data, where the user input data relates to a modelled process. For example, in a food processing model user input data may include data entered into the system, for example at the first hierarchy level, a measurement of food temperature, data identifying whether/when a food preparation process, or cleaning process, or checking process has been performed, and the like. Optionally a handheld or other deice at the first hierarchy level may include code and/or data defining a systematic data collection mechanism for capturing such user data in a structured manner (for example checklist data).

In embodiments at least one sensor is a temperature sensor, which is particularly appropriate for food process monitoring but this is not essential. More generally sensors used in the system may additionally or alternatively include (but are not limited to): a pressure sensor, a humidity sensor, a contact switch sensor, a chemical or gas sensor such as an ammonia sensor, a carbon dioxide sensor, a carbon monoxide sensor, a water or other liquid level sensor, an acoustic sensor (with optional sound recognition processing), and a position/location sensor. Similarly, although some preferred embodiments of the system employ one or more a logical behaviour models relating to a food processing environment, in principle the architecture of the systems we describe may be employed for monitoring/auditing other processes. Examples include, but are not limited to: a process for monitoring the supply of natural gas to premises, including monitoring gas pressure; a process for monitoring agricultural production or livestock-based farming production (for example chicken farming, milk production and the like), including human/animal safety sensing and/or product characteristic sensing; and so forth.

In embodiments when any system element, for example a handheld device, sensor/transducer, hub/gateway or server, generates an event, then that system element preferably incorporates data provenance information along with the event data. The event may be, for example, the result of some measurement or some rule of the logical behaviour model firing. This provenance data may be stored in the cloud together with the actual event. A node, optionally each node, which transmits the data, for example a repeater, may add provenance data of its own, for example data defining that the path taken by the data includes that node.

The skilled person will appreciate that a logical behaviour model may be constructed for a wide variety of food and other processing environments, and embodiments of the system may incorporate multiple such models. For example a logical behaviour model may be constructed for a refrigerator or freezer and/or a hot-hold counter. More generally a logical behaviour model may be constructed for a process which involves human interaction additionally or alternatively to a task performed by a machine, for example a routine task or set of tasks to be performed by a user according to a schedule or instructions, preferably provided by the system, say via a handheld device. The implementation of such a model could include inputting data such as one or more measurements of, for example: temperature, cleanliness, humidity, ammonia level, an event time (for example food arrival, food into storage), or the like.

By way of one example, in embodiments the system may include a a logical behaviour model of refrigerator behaviour. In this example the environment data may comprise data relating to an internal temperature of the refrigerator and the second data may relate to a second sensed aspect of the refrigerator, for example one or more of a door sensor, a battery status sensor, an ambient temperature sensor, and one or more sensors monitoring a compressor function of the refrigerator. The logical behaviour model may comprise rules to infer an error or fault condition from the sensed data; this error or fault condition may relate to an error/fault in the refrigerator itself or to an error/fault relating to the operation of the refrigerator, for example that the fridge is too full, that the compressor needs servicing and so forth. For example during normal operation the internal temperature of a fridge (or the like) cycles as the compressor operates and typically also shows longer term trends, for example down at night and up during the day (when the fridge door is frequently opened). The longer term trends may be used to determine a first type of characteristic data for use in the model and/or the compressor cycles may be used to determine a second type of characteristic data for use in the model. For example the rate at which the compressor cycles may be used as an indication as to whether the fridge needs defrosting or whether the fridge is overfull (faster cycling).

Thus in a further related aspect the invention provides a system for monitoring food storage conditions, the system comprising: at least two sensors monitoring the behaviour of a refrigerator, a first, temperature sensor and a second sensor; a processing system, coupled to said at least two sensors, said processing system comprising code configured to control a processor to apply a model of a behaviour of said refrigerator to data from said at least two sensors, and to infer an error/fault condition from said model of said behaviour for monitoring food storage conditions within said refrigerator.

In embodiments, the second sensor is configured to sense one or more of: door opening of said refrigerator, ambient temperature of said refrigerator, and a compressor function of said refrigerator; and wherein said model of said behaviour comprises a set of rules to be applied by said processor to a combination of said sensor data from said at least two sensors to infer the error/fault condition.

In embodiments, the rules are distributed across a hierarchy of processing entities in said system; wherein the system includes one or more inputs to receive event data; wherein said event data comprises an event which changes a state of said model; and wherein said one or more inputs comprise inputs at a higher level of hierarchy in said system than a hierarchy level of said at least two sensors.

Preferably, at least one of said one or more inputs comprises a user input.

According to a further aspect of the invention, there is provided a cloud-based monitoring system for monitoring in particular food processing, the system comprising:

at least one sensor for use in a process environment to be monitored, wherein the at least one sensor is configured to capture environment data relating to the monitored environment;
a hub device coupled to the at least one sensor; and
a cloud-based monitoring and reporting system located remote to the monitored environment, to store the environment data;
wherein the hub device and the at least one sensor form a network; and
wherein the hub device is configured to:
scan for available radio frequency channels in the network;
query the or each sensor to determine the radio frequency channels used by the sensor;
receive radio frequency characteristics for the or each sensor in the network; and
determine an optimum frequency for reliable transmission of the captured environment data from the or each sensor to the cloud-based monitoring and reporting system.

As mentioned earlier, the term 'optimum frequency' is used herein to mean the radio frequency which provides maximum data throughput, and/or maximum data transmission reliability. This may not necessarily be the fastest frequency.

The term 'network' used herein means any radio-frequency based network, such as, but not limited to Wi-Fi, Bluetooth and ZigBee networks.

In embodiments, the system comprises at least one repeater coupled to the or each sensor, wherein the hub device is configured to query the or each repeater to determine the radio frequency channels used by the repeater, receive radio frequency characteristics for the or each repeater and determine the optimum frequency using both the sensor and repeater radio frequency characteristics.

Preferably, the repeater and the sensor comprise Bluetooth and/or Wi-Fi interfaces.

In embodiments, the radio frequency characteristics comprise one or both of allowable signal level and channel bandwidth.

According to a further aspect of the invention, there is provided a cloud-based monitoring system for monitoring process temperature, for example food storage temperature, the system comprising: at least one fixed temperature sensor for installation in an environment to be monitored, wherein the at least one fixed temperature sensor is configured to collect fixed location temperature data relating to the monitored environment; at least one handheld sensor for a user to collect mobile location temperature data relating to the monitored environment; and a remote monitoring and reporting system located remote to the monitored environment, to collect the fixed location temperature data and the mobile location temperature data from the fixed sensor and handheld sensor respectively; wherein the fixed temperature sensor comprises: a (single) circuit board bearing a radio for radio-frequency (RF) communication of sensed temperature data, the radio having an antenna, and a temperature sensor, and a plastic housing enclosing the circuit board, wherein the plastic housing is bevelled at one corner or edge; and a compressible thermal coupling substance compressed between the bevelled corner or edge and the temperature sensor; wherein the antenna of the radio is displaced away from the bevelled corner or edge.

According to a further aspect of the invention, there is provided a cloud-based monitoring system for monitoring in particular food processing, the system comprising: a plurality of handheld sensors for a user to collect mobile location environment data relating to the monitored environment. In preferred embodiments these provide data for a (potentially distributed) logical behaviour model as previously described, and may also implement part of such a model. Preferably each handheld sensor comprises an electronic identifier to indicate sensor type. The system further comprises a remote monitoring and reporting system located remote to the monitored environment, to collect the mobile location environment data from each handheld sensor; and a portable device comprising a display screen and a processor configured to: display a task on the display screen requiring a user to collect mobile location environment data relating to the monitored environment (in particular referring to the checklist(s)/model(s) described above and later); display a type of handheld sensor to be used to perform the displayed task; receive the electronic identifier of a selected sensor, selected by the user from the plurality of handheld sensors; and determine whether the received electronic identifier indicates the sensor type matches the type of handheld sensor required to perform the task, and wherein if the sensor type does not match, the portable device outputs a warning to the user.

The warning may be one or both of a visual alert displayed on the portable device display screen, or an audible alarm emitted by the portable device.

According to a further aspect of the invention, there is provided a cloud-based monitoring system for monitoring food storage/processing conditions, the system comprising:

at least one temperature sensor for use in a food storage environment to be monitored, wherein the at least one temperature sensor is configured to collect temperature data relating to the monitored environment, and wherein the temperature sensor has a factory calibration defined by factory calibration data;

a data store to store the factory calibration data for the or each temperature sensor; and a processor running computer control code to adjust the factory calibration by:
inputting a height above sea level of the temperature sensor;
inputting a reference sensed value from the temperature sensor when the temperature sensor is in boiling water at the inputted height;
adjusting the factory calibration dependent upon the reference sensed value and the inputted height.

BRIEF DESCRIPTION OF THE DRAWINGS

The invention is diagrammatically illustrated, by way of example, in the accompanying drawings, in which:

FIGS. 9a to 9c show, respectively, a flowchart of example steps to determine whether a refrigerator is operating correctly using the system of FIG. 2, a cloud-based system for monitoring food storage conditions incorporating a distributed device model according to an embodiment of the invention, and an example of a distributed refrigerator model for the system of FIG. 9a;

FIG. 14 shows an example report generated by the system.

DETAILED DESCRIPTION OF THE DRAWINGS

Broadly speaking, the present invention provides a cloud-based and user-friendly monitoring system for auditing food storage conditions, in which users are prompted to perform particular tasks, and any data collected by performing the tasks is appended with provenance data in order to track the origin and authenticity of the data. The system enables this data to be stored in a central, cloud-based data store, where it can be accessed at any time.

Preferably, components within the system are modular components, which are configured to work together and which can be installed by an unskilled user on a site to be monitored.

Figure 2:
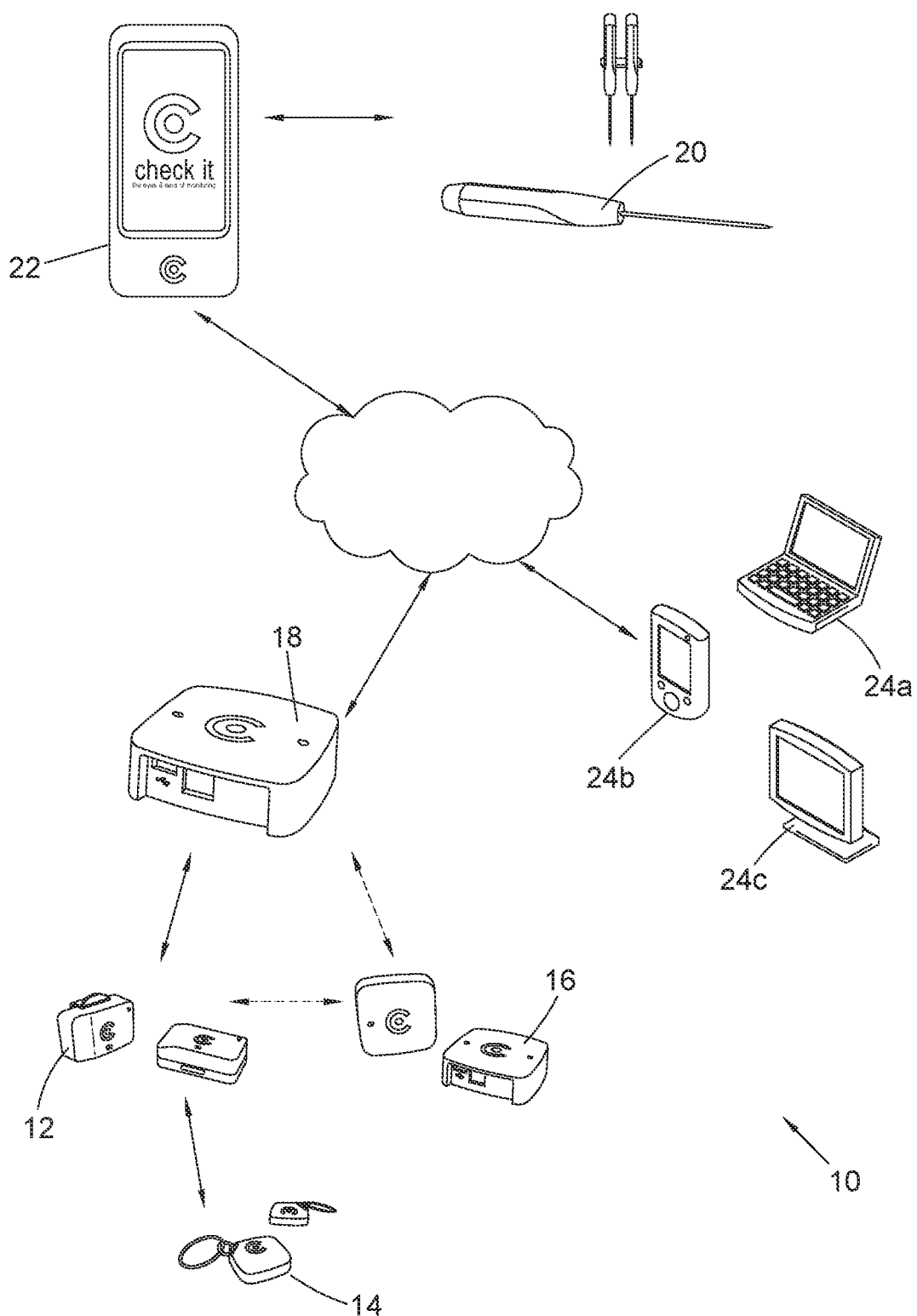
FIG. 2 illustrates a system for performing checks and compiling reports in an embodiment of the invention.

FIG. 2 illustrates a system for performing checks and compiling reports in an embodiment of the invention. The system 10 (also known as "Checkit") comprises a plurality of modular system components which work together to provide fast and easy food safety monitoring and to simplify HACCP reports. The system 10 comprises one or more fixed sensors 12, which are smart, wireless sensors installed in a particular environment to continuously monitor variables such as temperature, humidity, and door open/close status. One or more fixed sensors communicate with a hub device 18, which receives the data collected by each fixed sensor 12. The one or more sensors 12 preferably transmit data to the hub device 18 via wireless means, since a single hub device 18 is positioned in an area containing multiple fixed sensors 12. The hub 18 is configured to collate all the data received from the or each fixed sensor 12. Preferably, the hub 18 also timestamps the data with the time it is received. The or each fixed sensors 12 collects and transmits fixed location environment data relating to the environment being monitored to the hub 18 either directly (as shown by the black arrow) if the fixed sensor is close enough to the hub 18 to communicate with it wirelessly, or indirectly via a repeater 16 (as shown by the dashed arrow), if the fixed sensor 12 is too far away from the hub 18 to communicate with it wirelessly. Each fixed sensor 12 automatically collects and transmits readings to the hub 18 every few minutes (optionally, via the repeater 16). This generates a continuous stream of data which may record, for example, whether or not a freezer is operating within the required optimum temperature range.

The hub 18 acts as the on-site gateway for the system 10, and is configured to receive and store the data from the or each fixed sensor 12. The hub 18 may be any computing device such as a PC, laptop computer, tablet computer, etc., which is configured for this function, or alternatively, the hub 18 is a purpose-built device. For example, the hub 18 may be a flat panel touchscreen device that is a modular component of the system 10 and is designed to be used with the other modular components (e.g. the sensors). The hub 18 is configured to run web-based software that enables users to set up their own HACCP procedures. The graphic user interface of the software alerts users to any issues requiring their attention, such as, for instance, a refrigerator that is not working within the required temperature range. The hub 18 may be configurable to send alerts to a user's PC, tablet or smartphone as soon as data indicating a problem is received from a fixed sensor or handheld sensor. The hub 18 automatically stores and organises data received from the or each fixed sensor 12, to provide an accurate log of the user's food safety and hygiene processes. Data is also automatically transmitted from the hub 18 to the cloud for secure storage and remote access.

The hub device is preferably provided with the "Checkit" software pre-installed, such that it can be set-up and used easily. The software comprises the user interface to enable a user to set-up and use the system to monitor an environment, and includes drivers for any peripheral devices (such as the fixed sensor).

The system 10 further comprises at least one magnetic fob 14 which is used to install the or each fixed sensor 12 within the system. Sensor installation comprises registering the sensor within the system, naming the sensor (so that it can be readily identified by users and the system), and placing the sensor in the environment to be monitored. Each fixed sensor 12 may be registered in the network (e.g. ZigBee) formed by a network bridge, which may comprise opening the network for joining, activating the sensor, negotiating the join, and then closing the network.

Preferably, each fixed sensor 12 is uniquely identifiable to enable a user to distinguish between sensors when they are installing/using the sensors. Each fixed sensor 12 comprises a user-friendly alphanumeric identifier (UFID), which is appended to the sensor (e.g. printed on the sensor or via a label adhered to the sensor), to enable a user to readily identify the sensor visually. The UFID may be formed of characters from the sensor's MAC address.

To install each fixed sensor within the environment to be monitored, each sensor is temporarily placed in the environment to determine the strength of a signal transmitted by the sensor and received by the hub device 18, such that it may be repositioned if the signal strength is too weak. Each fixed sensor is then permanently attached in place within the monitored environment (e.g. using adhesive pads, glue, screws, etc.), so that the sensor always monitors the environment from the same, fixed position within the environment. The term "signal strength" may be based on link quality index (LQI), the received signal strength indicator (RSSI), or a combination of both metrics.

Figure 3A:
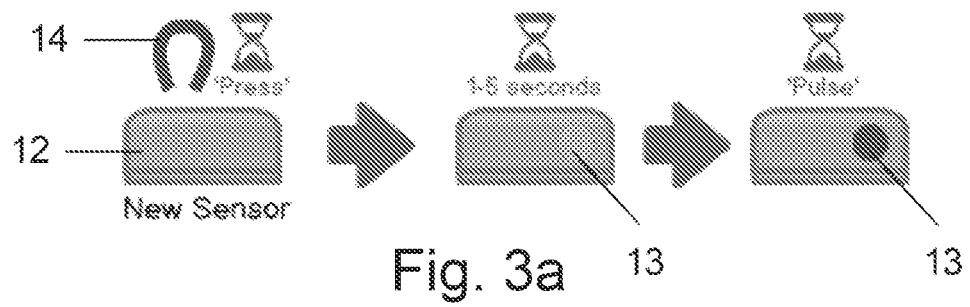
FIGS. 3a to 3e depict steps to set-up a sensor in the system of FIG. 2.

The Checkit software on the hub 18 provides an installation wizard to guide a user to install sensors in the monitored environment and within the system 10. The installation wizard prompts the user to collect all fixed sensors 12 to be installed. The software displays a list of sensors installed in the environment, which will be an empty list at the start of this process. The user is prompted to activate a sensor to be installed, by choosing a fixed sensor 12 and using the magnetic fob 14 to activate the sensor. Each fixed sensor 12 comprises a reed switch, which is operated by an applied magnetic field. The magnetic fob 14 is brought close to, or pressed against, the fixed sensor 12 to switch the sensor on. The sensor preferably comprises one or more lights or LEDs 13 to visually indicate whether a sensor is operating correcting, which provides a more user-friendly component for a user to install and use. FIG. 3a shows the steps to register a fixed sensor 12 within the system. A new fixed sensor is switched on using the magnetic fob 14, and the sensor mode light 13 is amber while the system is accepting the sensor into the network. Once the sensor has been accepted/registered, the sensor mode light 13 turns green to visually indicate to the user that the registration process has been completed successfully. The installation wizard on the hub 18 confirms activation/registration of the sensor.

Figure 3B:
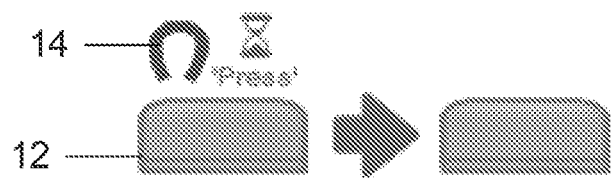
Figure 3C:
Figure 3D:
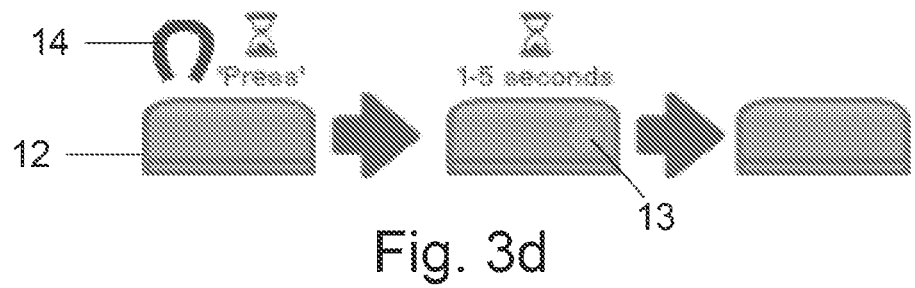
Figure 3E:
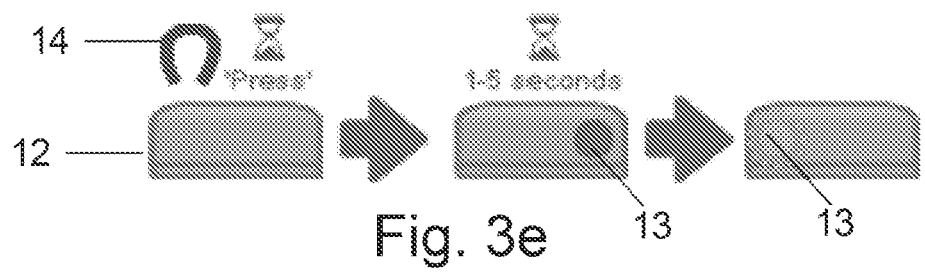

FIGS. 3b to 3e depict problems which may arise during the sensor registration process, and illustrate how the sensor mode light 13 is used to help a user to troubleshoot the problem. In FIG. 3b a fixed sensor 12 is determined to be dead or faulty, because applying the magnetic fob to the sensor does not activate the sensor mode light 13 to turn on (i.e. the reed switch may be damaged). In FIG. 3c, the sensor which the user is attempting to register has already been registered—here, applying the magnetic fob 14 simply activates the registered sensor, which briefly shows its signal level (e.g. on a display, or via a light/LED), before turning off. In FIG. 3d, the sensor is activated but after some time of attempting to register on the network, the sensor switches off (i.e. the sensor mode light 13 turns off). In FIG. 3e, the sensor is activated but is out of range to be able to communicate with the hub device and register in the network. The sensor mode light 13 may flash once in red, and then flashes amber to indicate a fault. In each case, the user may consult a user manual/installation guide to determine what the sensor mode light status means, and to determine what action to take. For example, the guide will state that for the scenario in FIG. 3b, the user should discard the sensor entirely, while for the scenario in FIG. 3c, the user is instructed to move the sensor closer to the hub, or use another sensor.

As each fixed sensor is registered within the system, the user interface of the hub device displays the registered sensor together with sensor data such as a sensor ID, and the sensor type (e.g. temperature sensor, humidity sensor, etc.). The user is prompted to name each sensor, so that each registered sensor can be readily identified. The user then places each fixed sensor in the required location in the environment to be monitored, as mentioned earlier. The sensor signal strength may be checked using a similar process to the registration process. Other components in the system, such as a repeater may be registered and installed in a similar manner.

Turning back to FIG. 2, the system 10 further comprises at least one handheld sensor 20. In embodiments, the handheld sensor is a smart, wireless temperature sensor. The handheld temperature sensor 20 enables users to perform checks and monitor storage and holding temperatures quickly. The handheld sensor 20 collects mobile location temperature data which is wirelessly transmitted to a portable computing device 22. The portable device 22 comprises a processor configured to receive the mobile location temperature data from the or each handheld sensor 20, and transmit an auditable version of the received mobile location environment data to the cloud for secure storage and remote access. The portable device 22 may be a smartphone, tablet, or other mobile computing device. In embodiments, the portable device 22 runs a mobile operating system such as the Android® operating system. The portable device 22 advantageously comprises the functionality and capability of a smartphone, such as the ability to capture images of barcodes and read barcodes, and to communicate with peripheral devices using Wi-Fi, Bluetooth, NFC, etc.

The portable device 22 is used to display workflow task lists to a user, to prompt a user to perform particular tasks. The portable device is also used to store the results of the tasks (e.g. any collected data, and/or an indication of when a task was completed), and to transmit the stored results to the cloud. Preferably, the portable device retains the results in its local memory until receipt of the data by the cloud server is confirmed. This ensures that data is not deleted until it has been safely stored in the central, cloud-based data store.

While the system 10 is primarily described as a means to monitor temperature within a monitored environment, the system 10 is not limited to this purpose. The fixed and mobile sensors may be temperature sensors, humidity sensors, door contact sensors, and any other sensor which can be used to monitor conditions with an environment and/or the operation of components within an environment (e.g. refrigerators, freezers, ovens, cookers, etc.).

The system 10 further comprises one or more computing device, such as a laptop 24a, a portable device 24b (such as a tablet, or smartphone), or a PC 24c. The computing device provides a web client (e.g. a web browser) which enables a user to access the data stored within the hub device 18 and/or the data stored within the cloud. If the computing device is located within the monitored environment, it may access the hub device via the intranet, whereas a secure connection may be used to enable the web client to access the cloud (e.g. via SSL).

The mobile location environment data received by the portable device 22 from the or each handheld sensor 20 is time stamped on receipt, and may further be appended with information to indicate the provenance of the data. For example, the processor of the portable device 22 is configured to timestamp the received data and to add information indicating that the data was received by that particular portable device. In embodiments, each handheld sensor 20 has the capability to append provenance data to the measured mobile location environment data, to indicate the data was measured by a particular handheld sensor. This provenance information is used to identify how the measured mobile location environment data is transmitted from the sensor to the cloud. The provenance information also enables the authenticity of the data to be verified.

Figure 1:
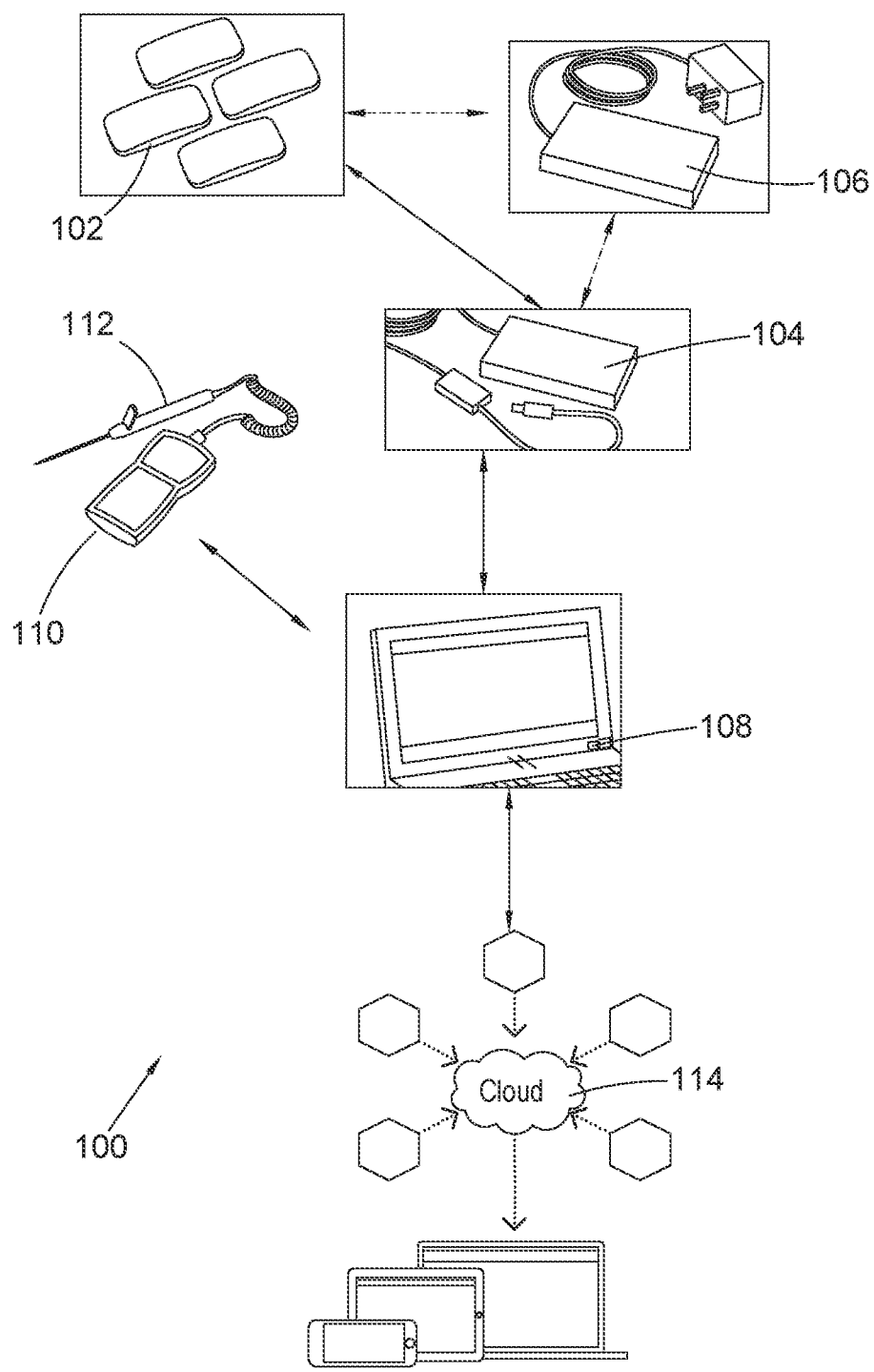
FIG. 1 illustrates a prior art system for performing checks and compiling reports.

Advantages of the illustrated system of FIG. 2 over the prior art system shown in FIG. 1 include that it has a lower cost to implement, is easier and more user-friendly to install and configure, and data is stored securely for legal requirements. In particular, as mentioned above, data is kept on the devices that generate the data until the data has been stored in the cloud. Furthermore, the provenance information enables the authenticity of data to be checked, which minimises the risk of data being tampered with. Another advantage of the present system is that functionalities of the system can be provided through software in the cloud. This means that if the internet connection at a particular site fails temporarily, a simpler service can be run locally at the site.

Figure 4:
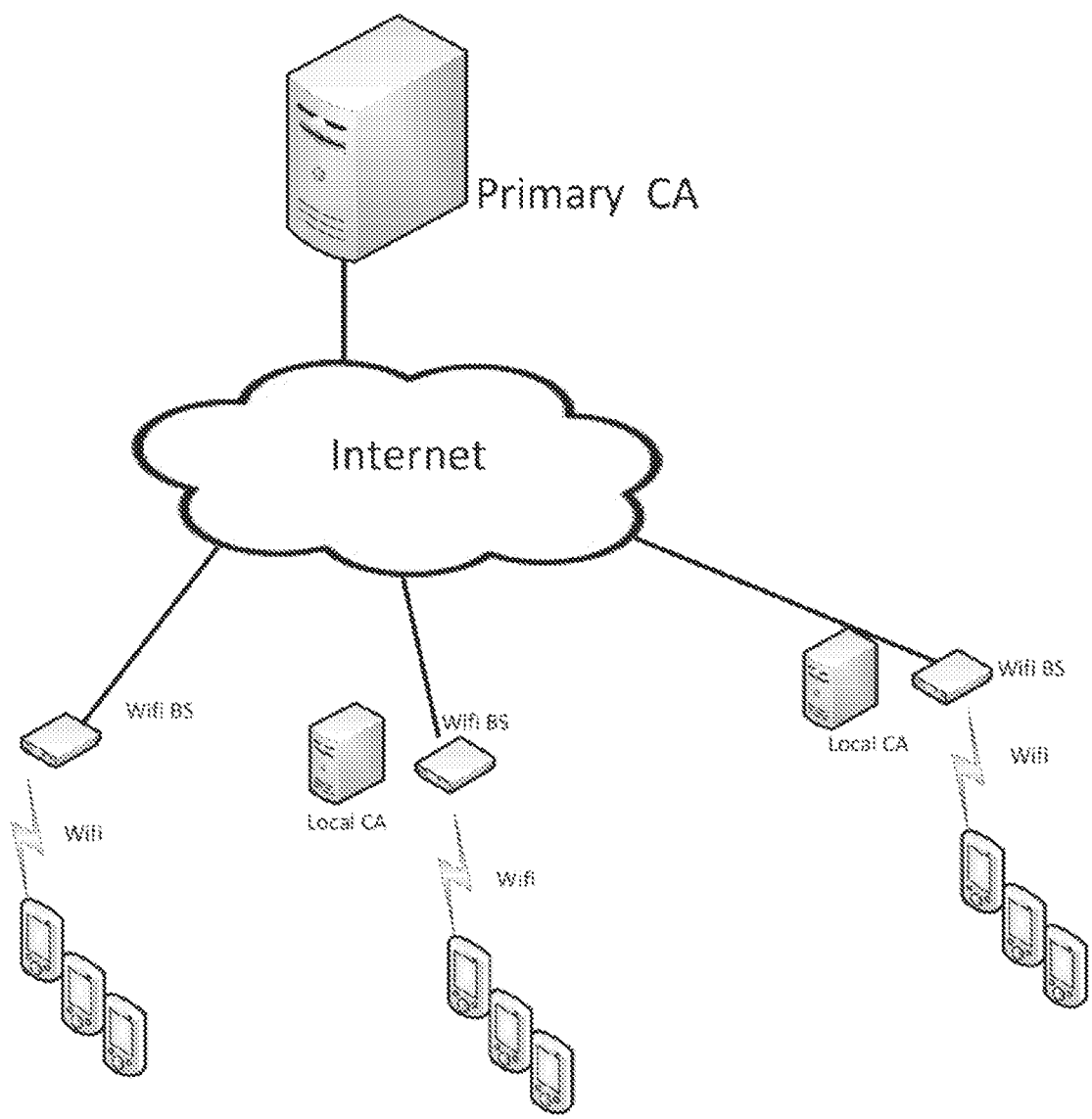
FIG. 4 illustrates system architecture in an embodiment of the invention.

FIG. 4 illustrates architecture to implement the cloud-based monitoring system for auditing food storage conditions across multiple sites (monitored environments). A particular user (e.g. a supermarket) may wish to monitor multiple sites (e.g. shops, delivery vehicles, warehouses, etc.). Therefore, a primary cloud application (CA) is provided for each user to enable data collected from each site to be centrally and remotely stored for ease of access. At each site, there is at least one sensor (fixed or mobile) which monitors the environment and transmits environment data back to the primary cloud application via the internet. Each sensor transmits environment data wirelessly to a hub or portable computing device which in turn transmits the received environment data to the primary cloud application. A local cloud application may optionally be provided at a site. The local cloud application is designed to support specific user and sites. The illustrated system enables a user to readily analyse data from multiple sites, and to define rules and workflows to be implemented at each site.

Figure 5:
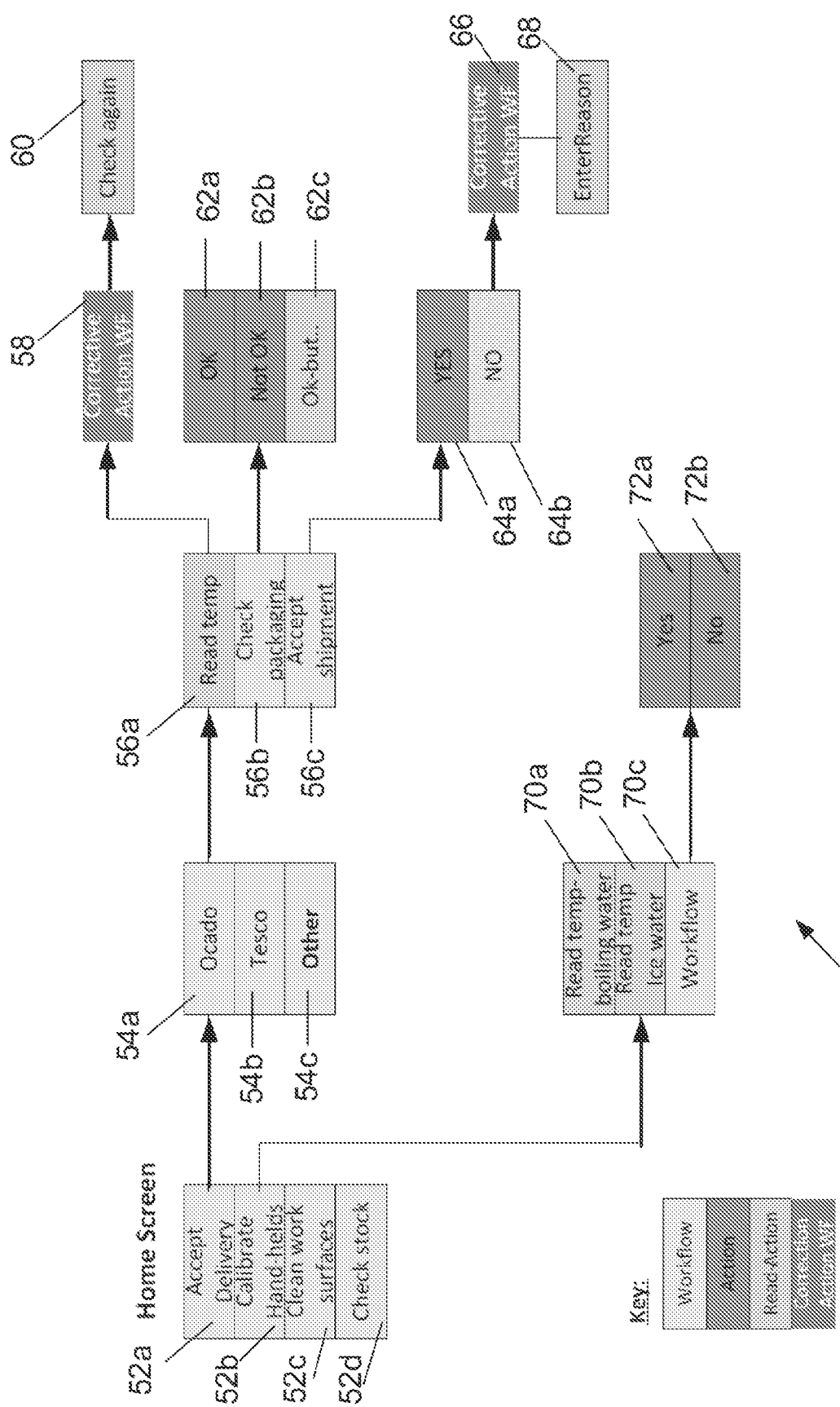
FIG. 5 depicts an example of a work flow implemented using the system of FIG. 2.

FIG. 5 depicts an example of a workflow 50 implemented using the system of FIG. 2. The example workflow 50 comprises four tasks, which are displayed on the home screen of a portable computing device 22. The number of tasks in any particular workflow may vary and may depend on the type of site being monitored. In this example, the site being monitored is a restaurant or other establishment where food is cooked or processed. Here, the four tasks are to accept a scheduled delivery of food/ingredients (52a), calibrate each handheld sensor used at the site (52b), clean work surfaces where food is prepared (52c) and to check stock (52d). The tasks may be displayed on the portable device in the order in which they must be completed, or otherwise. The workflow tasks, scheduling of tasks and frequency of tasks is defined by a user for the specific environment being monitored before being implemented. This provides flexibility in the system that enables a user to customise the workflows according to their own requirements.

If a user clicks on or otherwise selects a particular task displayed on the portable device, the user may be shown an action to take to perform the task, or may be asked to make a further selection from a sub-menu in order to determine what action to perform. For example, for the workflow to accept a scheduled delivery (52a), the user is promoted to select which company is making the delivery from a sub-menu, drop-down list, etc. Here, the delivery may be from Ocado (54a), Tesco (54b), or another company (54c). If the delivery is from Ocado, the user selects this from the sub-menu and is prompted to perform an action to measure the temperature of the delivery vehicle 56a (e.g. the refrigerated part of the delivery vehicle). If the temperature of the refrigerated part of the vehicle is too high to safely store food, then the user is prompted to take corrective action 58, such as logging that the refrigerated part needs repair, or to perform the measurement again 60 to check if the temperature sensor used is faulty or accurate.

Once the temperature checks have been performed, the user is prompted to begin the check packaging workflow tasks 56b, which may comprise checking if food packaging is intact. The user is prompted to indicate if the packaging is acceptable (62a), unacceptable (62b) or acceptable under certain conditions (62c), which may require a user to enter the conditions or log any issues.

Next, the user is prompted to begin the delivery acceptance workflow tasks (56c). Here, the user is simply required to choose if the delivery is accepted (64a) or is not accepted (64b), based on the results of the previous two workflows (56a, 56b). If the delivery is not accepted, the user is required to take corrective action (66), such as reordering the items in the delivery, and to enter the specific reasons for future reference (68).

The next workflow task on the portable display device is to calibrate the handheld sensors (52b). Selecting this workflow prompts a user to perform several actions. For example, in the case of a handheld temperature sensor, the user calibrates the sensor by inserting the sensor into boiling water (70*a*), and then inserting the sensor into ice water (70*b*), and to complete each action, the user must log the temperature readings into the system using the portable device. Once entered, the user is asked if the workflow has been completed (70*c*), and selects yes (72*a*) or no (72*b*) as appropriate.

Figure 6:
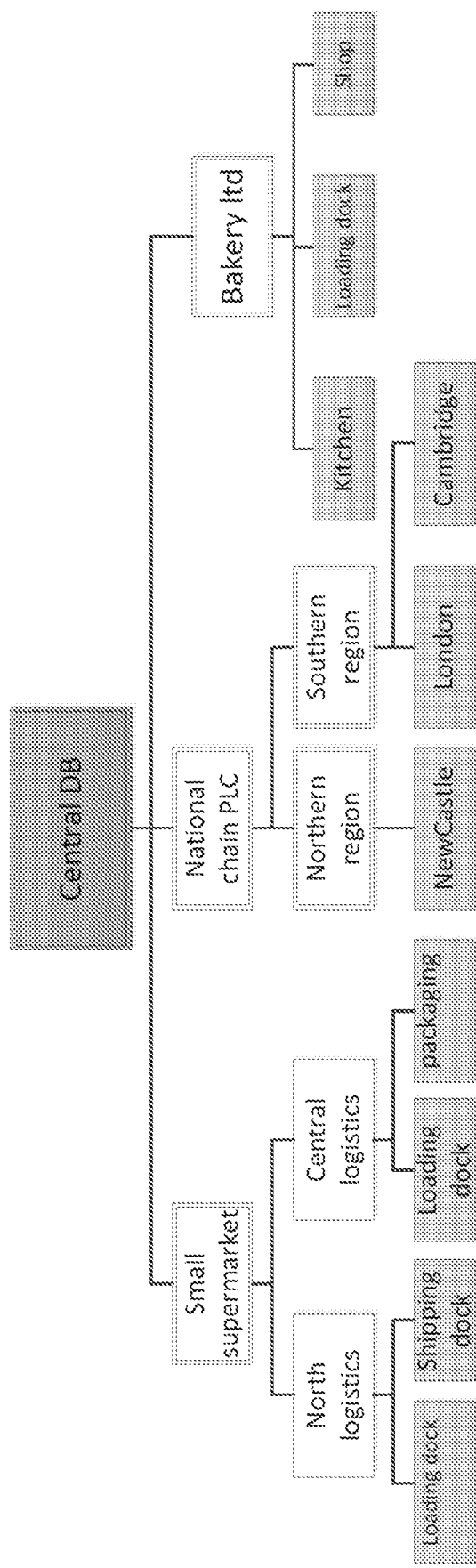
FIG. 6 shows an example of a customer/site hierarchy in the system of FIG. 2.

FIG. 6 shows an example of a customer/site hierarchy in the system of FIG. 2. A single central cloud-based database may be provided to store data collected from several customers (e.g. small supermarket, national chain, a bakery, etc.). Each customer may have multiple sites at which they must monitor the food storage conditions, such as the national chain's stores based in the North of the UK, and those based in the South of the UK. Each site may have particular environments within it which require monitoring. For example, a loading dock and a shipping dock within the same site may need to be monitored. The hierarchy enables different sites to be managed using the same system, and workflows may be scheduled for each site locally to suit the particular environment being monitored.

Figure 7:
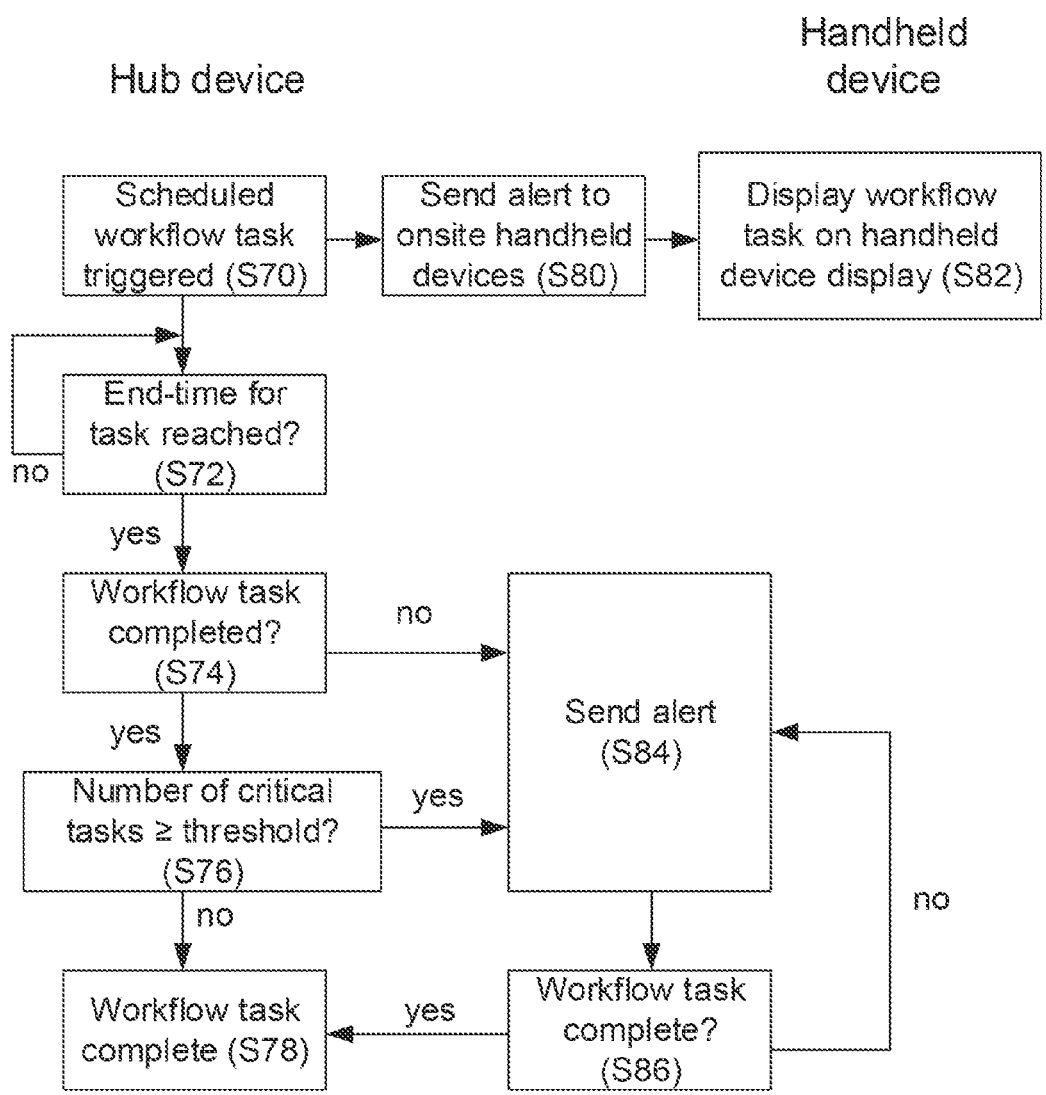
FIG. 7 is a flowchart of example steps to perform a scheduled workflow.

FIG. 7 is a flowchart of example steps to perform a scheduled workflow. A scheduled workflow task is triggered (S70) by the portable computing device and/or the hub device, which receives and stores workflows for the monitored environment from the cloud. For example, a scheduled workflow may be to clean all cooking surfaces at 06:00 each day, or to accept a delivery of food at 10:00 every Monday. The hub device sends an alert to perform a task to the onsite handheld devices (S80), and the handheld devices display the received task (S82). In the case the workflow task is triggered on the portable device, the portable device itself displays the task. A user on the site is required to use the portable device to perform the task, as explained above with reference to FIG. 5, The hub device (and/or portable device) checks if the scheduled task end-time has been reached (S72). For example, cleaning the cooking surfaces may have an end-time of 30 minutes from the scheduled start time. If the end-time has not been reached, the device waits and rechecks. If the end-time has been reached, the device checks if the task has been completed (S74). If no data has been received from a sensor or the user, or otherwise, the device assumes the task has not been completed and sends another alert or reminder to prompt a user to complete the task (S84). The device checks again if the task has been completed (S86). If the workflow task is complete, the system also checks if the number of critical issues logged in the system is greater than or equal to a threshold value (S76). If the threshold is exceeded, the device sends an alert. If the threshold is not exceeded, the workflow has been completed (S78).

Figure 8:
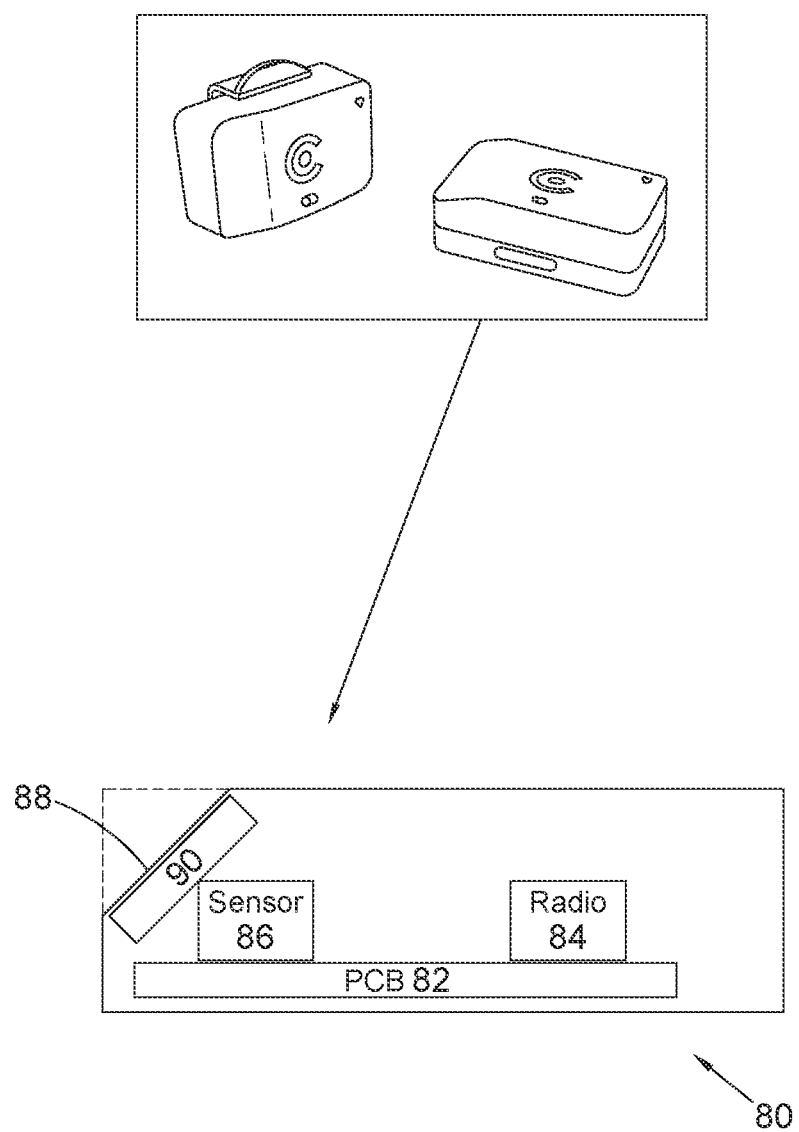
FIG. 8 illustrates an example fixed temperature sensor of the system.

FIG. 8 illustrates an example fixed temperature sensor 80 used to measure temperature in the monitored environment. The temperature sensor 80 is preferably wireless and comprises a circuit board 82 (e.g. a printed circuit board) bearing a radio 84 for radio-frequency (RF) communication of sensed temperature data, the radio having an antenna, and a temperature sensor 86. A plastic housing encloses the circuit board 82, which is bevelled at one corner or edge 88. A compressible thermal coupling substance 90 is compressed between the bevelled corner or edge 88 and the temperature sensor 86, and the antenna of the radio is displaced away from the bevelled corner or edge. The radio antenna requires a certain amount of space between it and the plastic housing, to prevent/minimise detuning by the plastic housing. In contrast, the gap between the sensor and the housing needs to be as small as possible, since the thermal conductivity of air is low, meaning that a large air gap between the housing and the sensor 86 may result in inaccurate temperature readings. Thus, the gap between the radio 84 and the plastic housing needs to larger than the gap between the housing and the sensor 86, and a bevelled corner/edge in the housing provides a solution to this problem. The small gap between the plastic housing and the temperature sensor 86 is filled with the compressible thermal coupling material 90, which has a higher thermal conductivity than air.

Figure 9A:
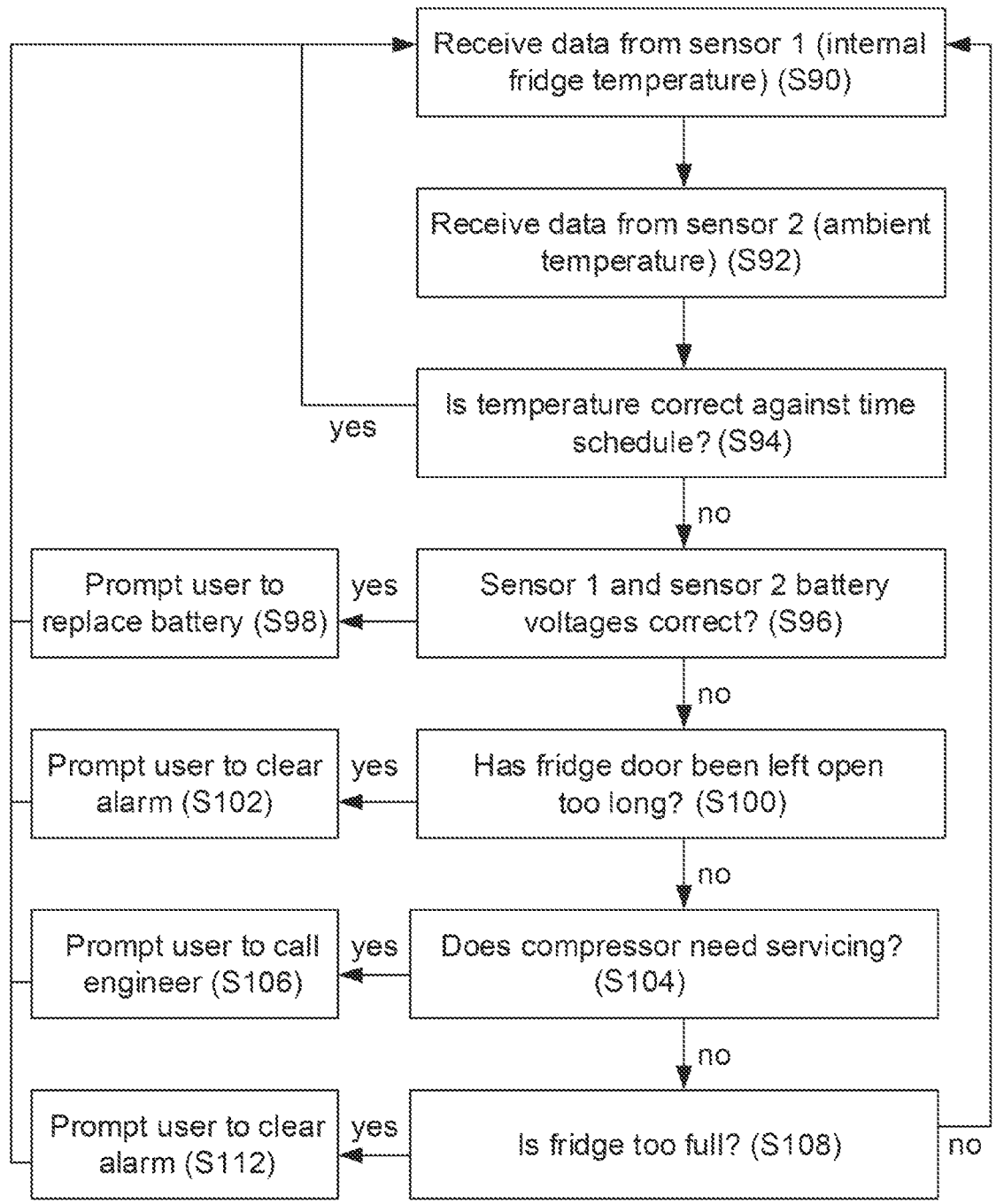

FIG. 9*a* is a flowchart of example steps to determine if a refrigerator is operating correctly using the system of FIG. 2. In embodiments these steps may be included in the processing of a cloud-based monitoring system for auditing food storage conditions as previously described. In this way, rather than simply monitoring the temperature of a refrigerator the correct operation of the refrigerator can be ascertained even when, for example, a monitored internal temperature may be temporarily outside a permitted range and/or when a monitored internal temperature is within a permitted range but other data indicate a fault or potential fault (which here also includes an alarm state).

Thus, FIG. 9*a* is a flow chart of example steps depicting how the hub device, portable computing device, and/or the cloud-based monitoring system may receive data from a number of sources and analyse the data to determine if a refrigerator is operating correctly. The cloud-based monitoring system receives data from a first sensor (step S90), which is a temperature sensor monitoring the internal temperature inside the refrigerator. The first sensor may also comprise means to determine and transmit the status of the sensor battery to the monitoring system. Raw data may be transmitted from the first sensor to the monitoring system every few minutes, e.g. every five minutes. A second sensor also transmits data to the monitoring system, (step S92), where the second sensor is a temperature sensor monitoring the external, ambient temperature outside the fridge/in close proximity to the fridge. Again, the raw data may be transmitted from the second sensor every five minutes. The second sensor may also comprise means to determine and transmit the status of the sensor battery to the monitoring system, and/or means to determine whether the fridge door is open or closed. The monitoring system applies rules to the internal and external temperature data to determine if the fridge is operating correctly. For example, the system checks if the internal fridge temperature is correct against a time schedule (stored in the system) (S94). If, for instance, a delivery of food items was scheduled for 11:00 and the internal fridge temperature rose from 2° C. at 11:00 to 6° C. at 11:15, then the temperature rise may be attributable to the fridge door being open while the delivered food items were being stored in the fridge. Consequently, the stored time schedule and rules allow the system to compensate for expected temporary increases in internal temperature. In this case, the system may determine that the fridge is operating correctly, and will await the next set of data from the first and second sensors.

If, however, no delivery of food was scheduled but the internal fridge temperature rose from 2° C. at 11:00 to 6° C. at 11:15, then the temperature rise was not expected. Consequently, the system checks if the batteries of the first and second sensors are operating as expected (S96). If one or both batteries are not functioning optimally, the system may need to disregard the temperature data received from the relevant sensor, and prompts the user to replace the battery (S98). The system may, for example, send a message to the hub device or portable computing device to prompt the user to take action.

If the batteries are operational and do not explain the change in internal fridge temperature, the system checks if the fridge door has been left open too long (S100). For example, if the fridge is being cleaned, or the fridge door has not been shut properly, the internal temperature may rise. The system sends a message to a user (via the hub/portable device) to close the fridge door, and then to clear the corresponding alarm/alert on the system (S102).

If the user indicates that the fridge door is closed, then the system checks whether the fridge compressor is working correctly or if it needs servicing (S104). The system is able to check the compressor cycle and determine if the compressor is working harder over time (taking into account the internal and external fridge temperatures). The system can thereby predict if the compressor is going to need to be repaired or replaced soon, and can send a message to the user to take pre-emptive action and call an engineer (S106).

The system may also check if the fridge is too full, which may cause the internal temperature to rise (S108). The system sends a message to a user to check if this is the case, and take corrective action (e.g. move some stored goods to another fridge, or to simply clear the corresponding alarm/alert on the system (S112)).

We have described a simple example refrigerator model with reference to FIG. 9a. However in embodiments of the system a distributed behaviour model is implemented using a set of rules distributed across a hierarchy of processing levels within the system, from the sensor/interface device level potentially up to the "cloud" or remote server level. The application of such a distributed model is not restricted to the behaviour of a refrigerator.

Figure 9B:
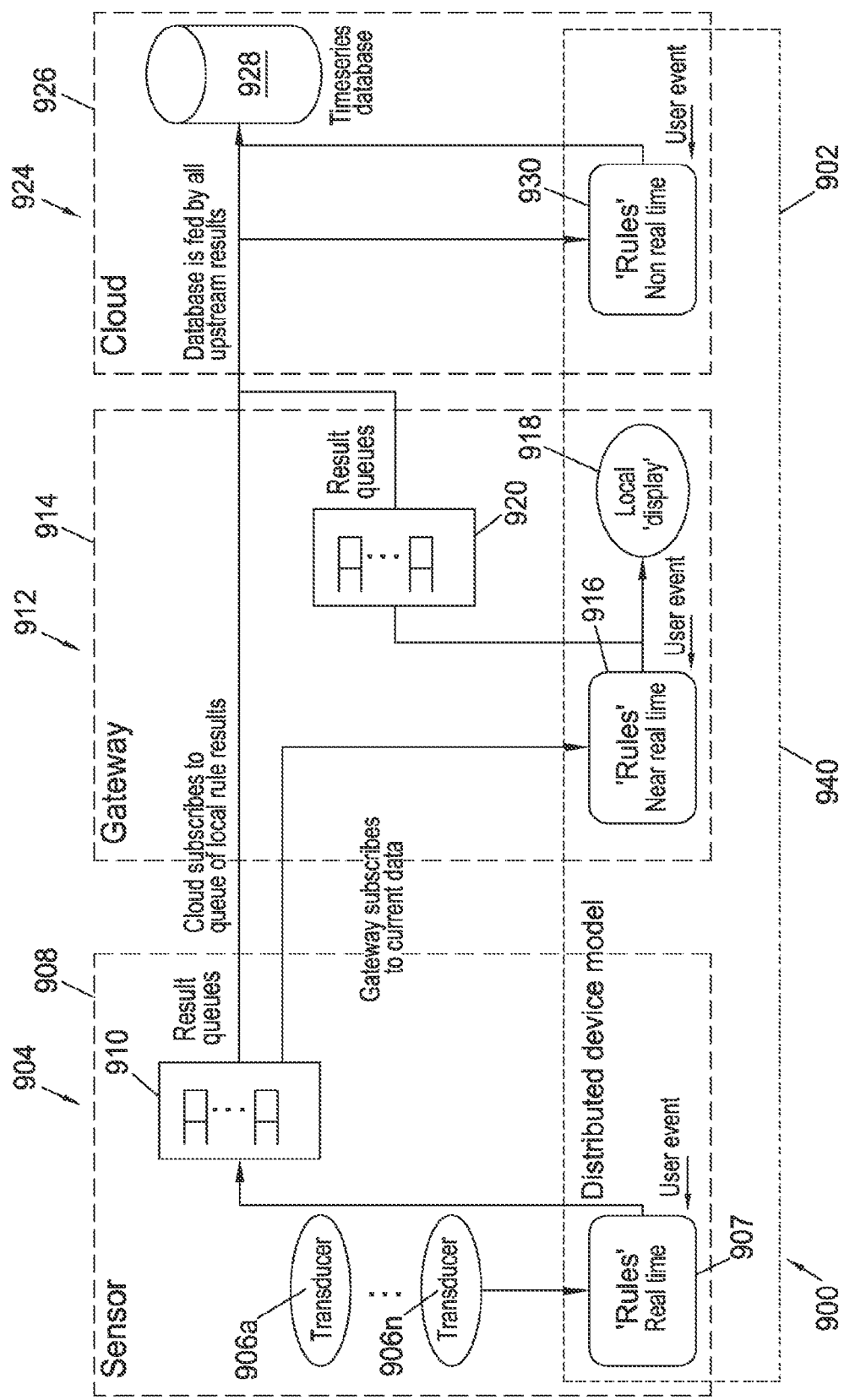

Thus referring to FIG. 9b, this shows an embodiment of a cloud-based system 900 for monitoring the storage conditions in which the system has a hierarchy of data capture/processing levels and implements a logical behaviour model 902 comprising a set of rules distributed across the hierarchy of levels. Thus in the example system a first, sensor level 904 comprises (transducers) 906a-n coupled to a fixed or handheld computing device 908 defining a first level of the hierarchy. Computing device 908 typically comprises a processor, a working memory and stored program memory storing code and/or data, in particular rule data 907, for interfacing with the transducers and for applying one or more rules 907 to the sensed data. At this first level of the hierarchy the rules are typically real-time rules. In the logical model illustrated in FIG. 9b result queries 910 are implemented at the first level of the hierarchy to provide query result data to one or both of the second and third levels of the hierarchy.

The second level 912 of the hierarchy comprises a gateway or hub computing device 914, again typically comprising a processor, a working memory, and stored program memory storing code and rule data for applying further rules 916 typically at this level mere real time rules. The rules 916 receive input from the results of queries 910 applied to the sensor/transducer data and, optionally, a local display 918 of the result of these fine rules is provided. In a similar manner to that described previously queries 920 may be applied to the results of rules 916 to provide query output data for the third level of the hierarchy. In embodiments the computing device 914 at the second level of the hierarchy may subscribe to current sensor/transducer data and the server at the third tier of the hierarchy may subscribe to a queue of local rule results from each of the lower levels of the hierarchy.

Thus a third level 924 of the hierarchy comprises a server 926 including a time series database 928 and a processor, working memory, and stored program memory storing code and rule data for rules 930 implemented at the third tier of the hierarchy. Typically the third tier rules are non-real-time rules. The time series database 928 is preferably fed by the results from each of the lower levels of the hierarchy.

In the system 900 of FIG. 9b the set of rules 907, 916 and 930 define a distributed device model 940. In preferred embodiments one or more, preferably each of the sensor rules also is able to accept user input data. This may be data input by a user, for example defining that a particular task has been performed and/or this may comprise user event data, (that is, data relating to a user triggered event), which may be data from a user interaction such as a corrective action taken. In principle an event output may also be generated at one or more of the different levels of the hierarchy. In the embodiments some events may change the state of the model. More particularly an event from further 'upstream', that is closer to the transducer, may change the state of the model downstream. In preferred embodiments the rules are not duplicative.

Preferably as illustrated a result queue is provided at one or each level of the hierarchy. These one or more queues store results; preferably a queue only empties when a subscriber, that is an element higher in the hierarchy, acknowledges that the data has been stored. This provides robustness to failure of elements in the system, in particular reducing the probability of losing data, which is important.

In some preferred implementations of the system at least user event rules have unique identifiers. Preferably messages within the system (in the result queues) also have unique identifiers, to facilitate queue management as previously described. An example unique identifier may comprise a pair of values defining an originator identifier and a time. In embodiments the first level hierarchy rules may be very simple, for example transmit data every five minutes or transmit when a door contact opens. Thus in embodiments these rules may be hard coded in the sensor/computing device 908. At the second and third tiers of the hierarchy preferably rules are user-definable, for example facilitated by a template.

Figure 9C:
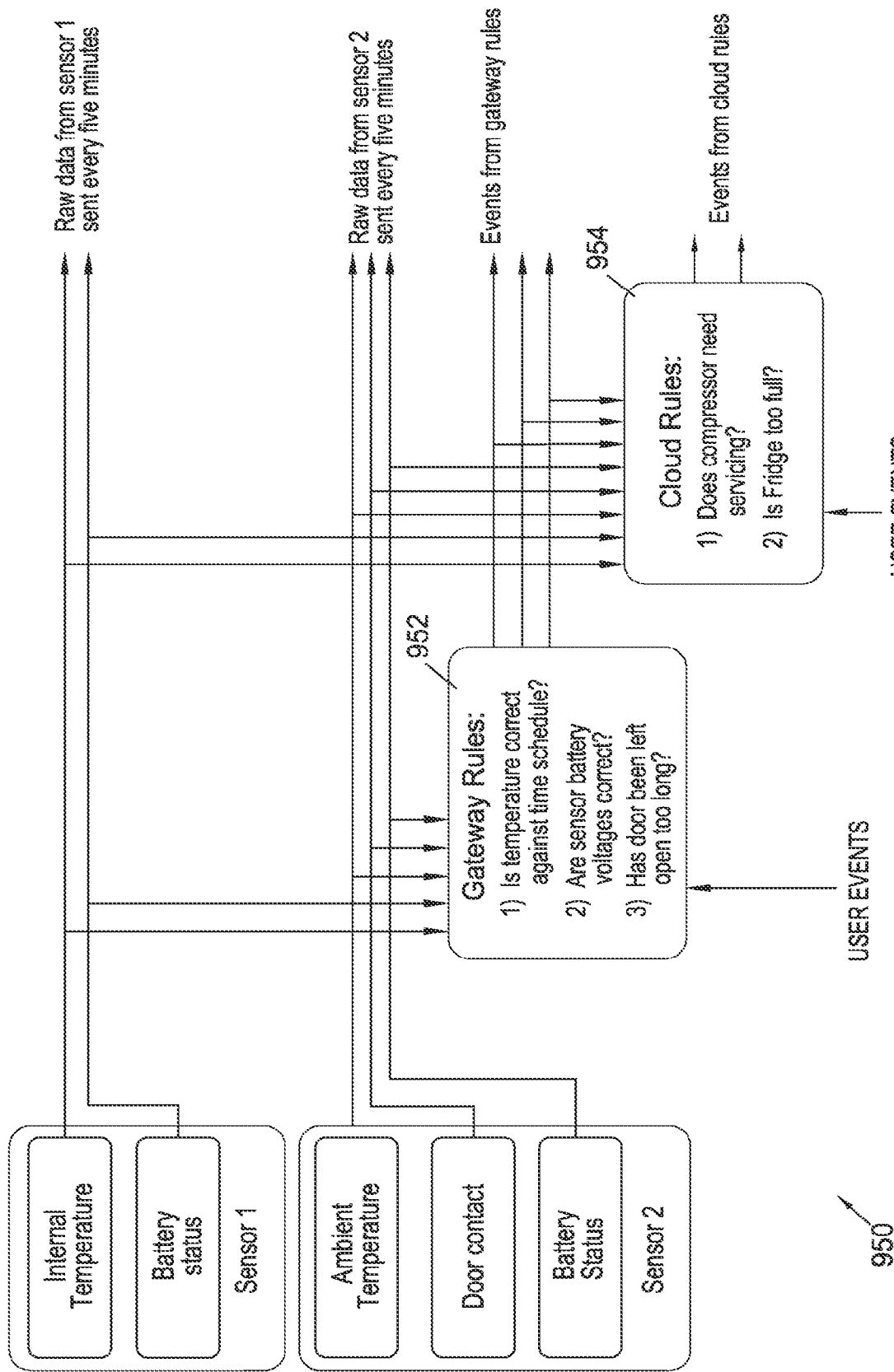

Referring next to FIG. 9c, this shows an example embodiment of a distributed logical behaviour model 950, in the illustrated example for a refrigerator. As illustrated the model has inputs from two sets of sensors each comprising one or more sensors, in the example a first sensor providing internal refrigerator temperature data and battery status data, a second sensor providing ambient temperature data, door contact data, and battery status data. A rule for the first sensor may be that raw data from the sensor is sent every five minutes; a rule for the second sensor may be the same.

As illustrated each of the sensors provides inputs to a set of gateway rules 952. By way of example some rules are:
 (1) Is internal temperature correct against time schedule?
 (2) Are sensor battery voltages correct?
 (3) Has door been left open too long?

In the example the gateway rules 952 also have user event input data; an example user event is clearing of an alarm caused by the door being left open too long.

The rules operating at the first and second tiers of the hierarchy provide data for a further set of rules 954 applied in the cloud. Examples of such rules are:
 (1) Does compressor need servicing?
 (2) Is the fridge too full?

Preferably rules 954 also have a user event input; an example may be to clear an alarm caused by the fridge being too full.

The events outputs from the sensors, gateway rules, and cloud rules are preferably all stored into the time series database 928 of FIG. 9*a*. Thus some data may be stored upon a regular time basis, for example temperature every five minutes; alarm limits as schedule changes. Other data may be stored on an ad-hoc basis, for example alarm events. In embodiments the stored data may also be labelled with a hierarchy or stored in such a way that a hierarchy is defined, for example the sensors, gateway, cloud hierarchy. As illustrated in FIGS. 9*b* and 9*c* in embodiments the model may combine data from two (or more) distinct physical sensors which may themselves each sense one or more different aspects of the monitored environment. In embodiments data retrieval from the time series database may be user role dependent. For example a sensor service technician may be provided with visibility of the battery data whilst the manager may wish to see how many alarm events occurred in the last week together with the raw temperature data. In embodiments filtering may be applied at/or moderately close the database to provide such output data. Other data output may, for example relate to the logical behaviour model, to illustrate the present or historical status of, say, a refrigerator model, for example to identify present or historical alarm or fault conditions.

It will be appreciated that such an approach may be applied to a wide range of logical behaviour models, for example for a chiller cabinet, a freezer, hot-hold counter, or even where a human operator is involved in performing tasks within the monitored environment. Thus sensor/user input data may also include data defining, for example, surface cleanliness, a goods delivery event, a food quality assessment event and the like.

Figure 10:
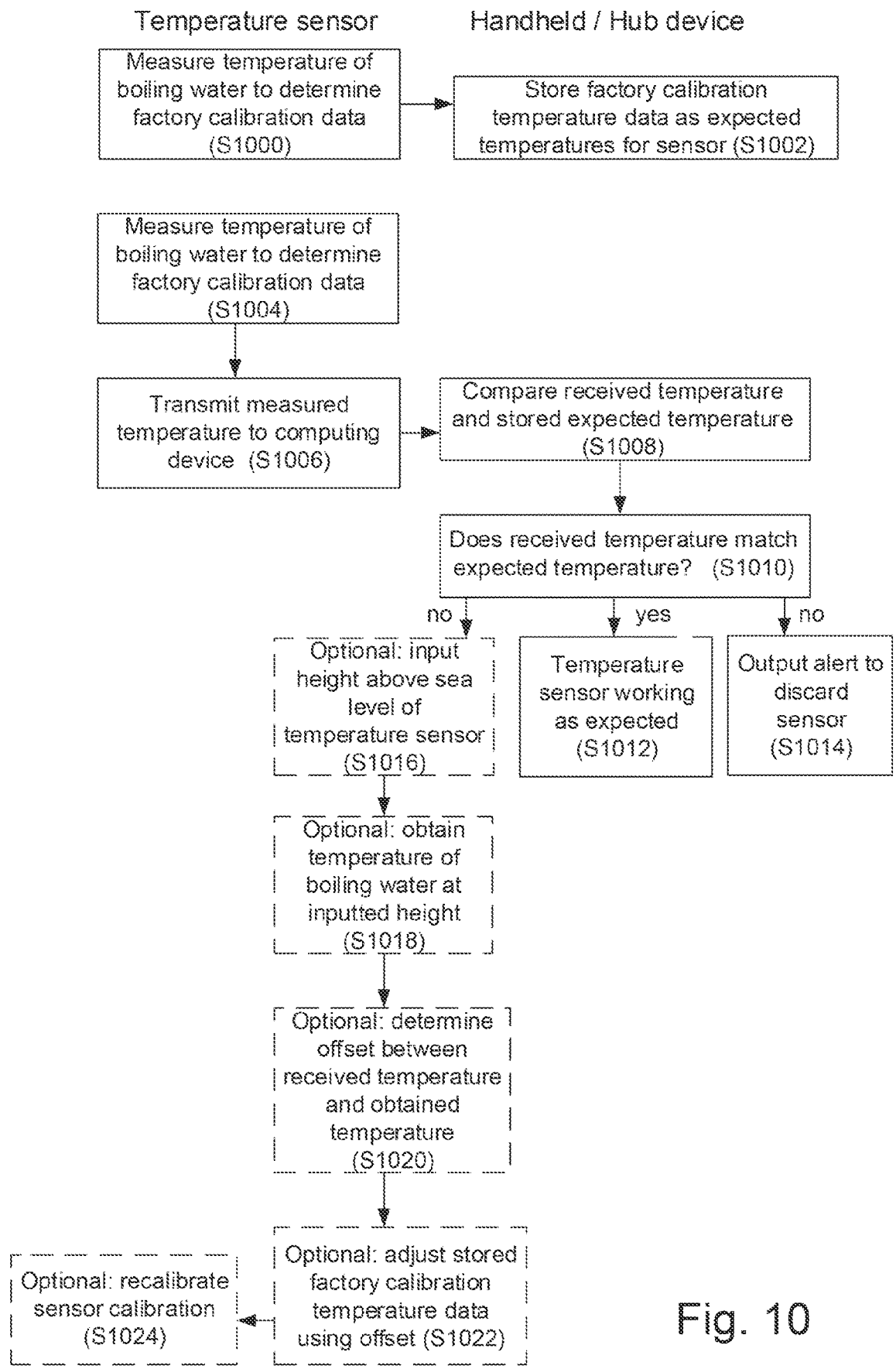
FIG. 10 is a flowchart of example steps to check whether a temperature sensor used in the system is operating correctly.

FIG. 10 shows a flowchart of example steps to check whether a temperature sensor used in the system is operating correctly. As mentioned above with reference to FIG. 5, handheld temperature sensors may need to be re-calibrated over time to ensure the readings obtained from the sensors are accurate. Before a new handheld temperature sensor is used, the user may be required to measure the temperature of boiling water (and/or ice water) to determine the factory calibration settings of the sensor (S1000). The determined factory calibration temperature data is stored within the handheld device/hub device and/or the cloud-based monitoring system as the 'expected temperature data' for the sensor (S1002). At sea level, the boiling point of water is 100° C. and thus, the temperature sensor should read 100° C. when inserted into boiling water at this height above sea level. In embodiments, the temperature sensors may be recalibrated to ensure that each sensor always reads 0° C. in ice water and 100° C. in boiling water (at sea level). Additionally or alternatively, the factory calibration data is simply stored to check whether the temperature sensor is consistent over time. For example, if the sensor reads 0° C. in ice water and 98° C. in boiling water (at sea level), then these settings are stored in the system and the sensor is checked regularly to determine if the sensor continues to give these readings. Any deviations in temperature from the stored settings may be used in this case to discard the sensor instead of recalibrating it.

When a scheduled workflow task is to calibrate a sensor/check the sensor for consistency, a user is prompted to measure the temperature of boiling water (and/or ice water) using the sensor (S1004). The measured temperature data is transmitted by the temperature sensor to the handheld device/hub (S1006). The handheld device or hub may be configured to perform the checks themselves, or may transmit the received data to the cloud-based monitoring system for analysis. In either case, the device/system compares the received temperature data against the stored expected temperature data for the particular sensor being tested (S1008). The system determines if the received temperature matches the expected stored temperature (S1010). If the temperature data matches, the temperature sensor is determined to be working as expected (S1012) and the workflow task is complete. If the temperature data does not match, the system/device determines that the sensor is not operating as expected, and may display a message on the screen of the handheld/hub device to prompt the user to discard the sensor (S1014).

Optionally, the temperature sensor is recalibrated to match the stored expected temperature data. To do so, a user is prompted to input (into the handheld/hub device) the height above sea level at which the temperature sensor is located (S1016), data which may be known to the user or can be readily obtained from the Internet. The user may also be required to input the expected temperature of boiling water at this height above sea level, or the device may be able to obtain/calculate this value itself (S1018). For example, at 600 m above sea level, water boils at 98° C., and thus, the temperature sensor is not expected to give a reading of 100° C. in boiling water at this altitude. The device/system uses the inputted data to determine an offset between the received temperature data from the sensor and the obtained/calculate temperatures at the input height above sea level (S1020). The offset is used to adjust the factory calibration temperature data (S1022) and the new, adjusted calibration data is applied to the sensor (S1024). This optional procedure depends on the sophistication of the temperature sensor, and whether it is able to be recalibrated for example.

Figure 11:
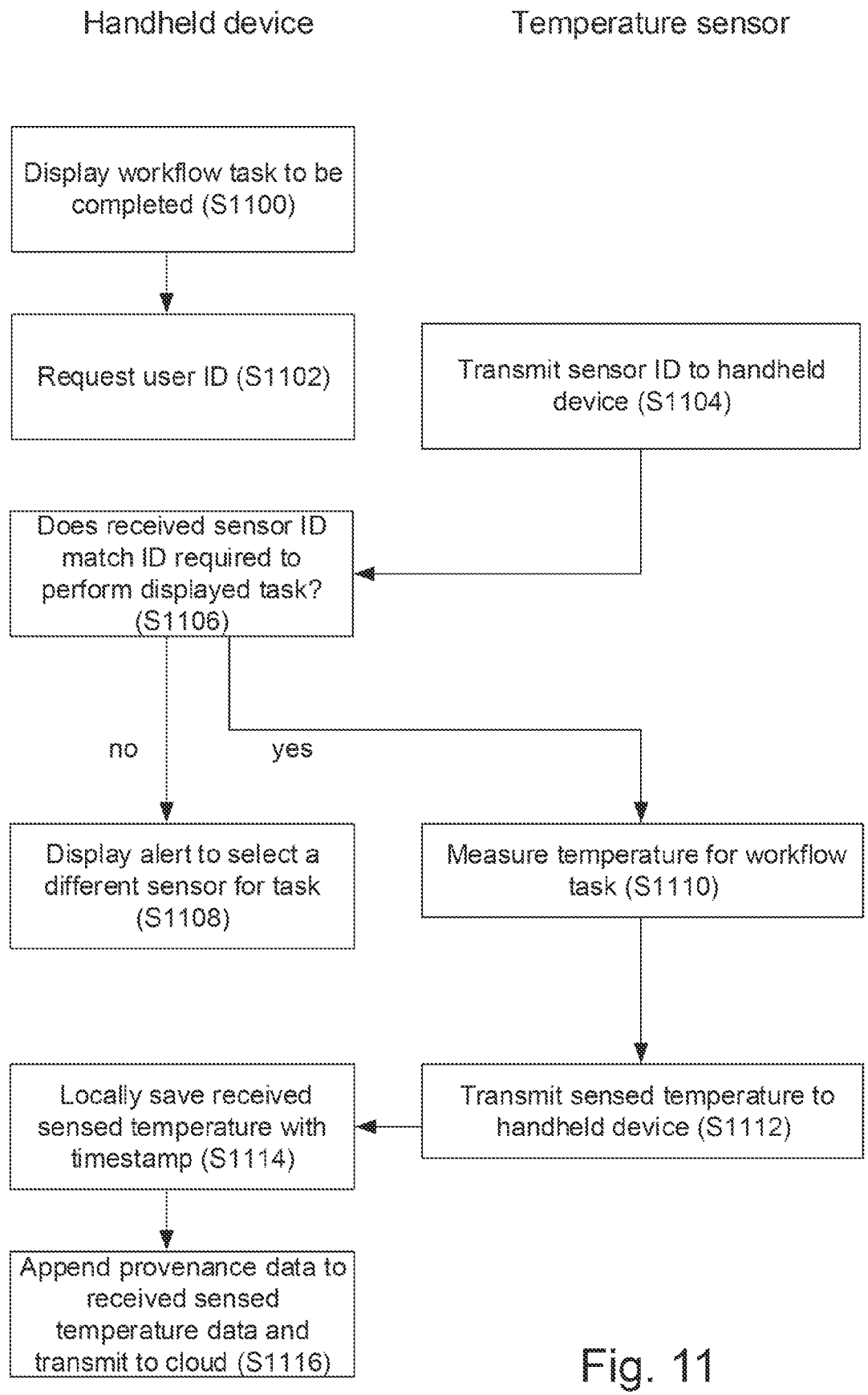
FIG. 11 is a flowchart of example steps to perform a task including determining a sensed temperature and providing audited temperature data.

FIG. 11 is a flowchart showing an example of steps which may be performed when measuring a temperature using the system. Importantly this includes generating an auditable version of the sensor data. Optionally such a user-performed measurement may be integrated into a defined user workflow as described further below.

Thus in more detail FIG. 11 shows how a workflow task which requires measuring temperature(s) is displayed to a user on a handheld/portable device (S1100). A user is prompted to enter their user ID before they begin performing the displayed task (S1102). The entered user ID is stored alongside the workflow task and the collected data such that, in case of any future queries about the particular task, it is possible to ascertain who performed the task.

The user selects a handheld temperature sensor to perform the task. For example, the displayed task may be to check the temperature of food being cooked in a kitchen, to ensure it is being cooked at the correct temperature according to the HACCP procedures. Typically, multiple handheld sensors are provided to perform such measurements, to prevent cross-contamination. For example, one sensor is used for measuring temperature of cooked meat, another for cooked vegetarian food, another for raw meat, another for raw dairy produce, etc. Consequently, it is important that a user uses the appropriate sensor for a particular food product. Temperature sensors may be provided in different colours, or with different coloured parts/labels, to help a user to visually distinguish between the sensors. However, the present system also provides a further check to ensure that the correct sensor is being used. As mentioned earlier, each handheld sensor comprises a sensor ID which indicates the sensor type (e.g. temperature sensor, humidity sensor, etc.). The sensor ID for each handheld sensor need not be unique to the sensor. The sensor transmits the sensor ID to the handheld device (S1104). The sensor may transmit this data continuously. Alternatively, when the handheld device detects that the sensor is in close proximity, it may request the sensor ID from the sensor.

The handheld device may store a look-up table or similar which enables the sensor type to be determined from the sensor ID. The look-up table and/or the workflow task state what sensor type is required for the task. The handheld device determines the sensor type using the received sensor ID and checks if this matches the sensor type required for the displayed task (S1106). If the sensor types do not match (e.g. the user has selected a temperature probe for cooked meat when the task is to check temperature of raw meat), the device displays an alert to the user to select a different sensor (S1108). The alert may comprise a visual alert (e.g. a message, which may also display an image of the correct sensor type), an audible alert (e.g. an alarm), or a combination of both.

If the sensor types do match, the user is prompted to measure the temperature(s) required by the workflow task (S1110). The temperature sensor transmits the sensed temperature to the handheld device (S1112). The temperature data received by the handheld device is saved locally within the handheld device (S1114). (The temperature sensor may also save the sensed temperatures internally, if the memory capacity of the sensor permits. The temperature sensor may clear its memory once it has determined that the data has been safely received by the handheld device and/or the data has been safely lodged within the cloud-based system). The handheld device is configured to append provenance data to the received temperature data (S1116) and transmits the data to the cloud-based system for storage. The handheld device preferably retains the local copy of the received data until it determines that the data has been safely received by and stored within the cloud-based system. In this way, each device in the system which creates or receives the data may locally store the data and append the data with provenance information. This enables a record of data transmission to be obtained and stored, which can be used to check if any devices have been compromised. It also ensures data is stored in one or more devices until it is safely stored in the cloud. This is advantageous if, for example, the internet connection fails at a site being monitored such that data cannot be immediately sent to the cloud.

Figure 12:
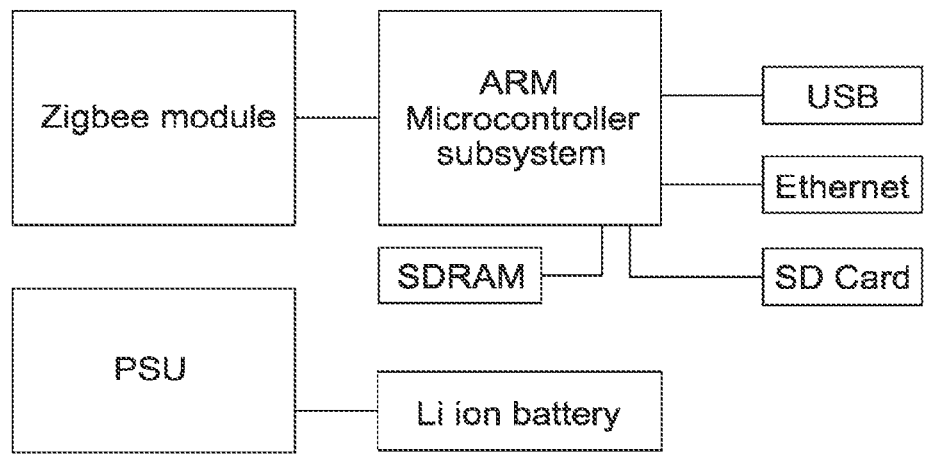
FIG. 12 illustrates the components of a hub device of the system of FIG. 2.

FIG. 12 illustrates the components of a hub device/gateway module of the system of FIG. 2. The hub device comprises a network module (e.g. ZigBee) to enable the device to connect to the network within the monitored environment. The device comprises a processor, microprocessor and/or microcontroller. The device comprises memory modules, a power supply unit, a battery (e.g. lithium ion battery), and interfaces to couple to external networks/peripherals, such as a USB port, an SD card slot, and an Ethernet port.

Figure 13:
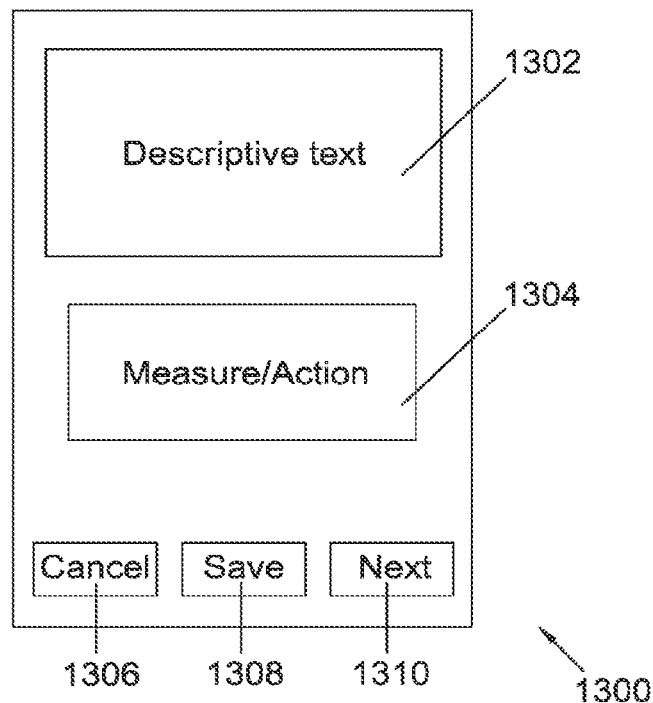
FIG. 13 depicts an example display of a handheld device of the system of FIG. 2.

FIG. 13 depicts an example display of a handheld device of the system of FIG. 2. The display 1300 comprises a descriptive text portion 1302 which contains text to describe a workflow task (or sub-task) to be performed by the user. For example, this may state "Measure the internal temperature of the fridge using a handheld sensor". The display comprises a portion 1304 which has different features/functions depending on the task to be performed. For example, the portion 1304 may be a radio-button asking the user to make a selection in response to the text 1302, or a drop-down list from which the user makes a selection, or a data entry box where a user can enter data manually. The display 1300 comprises a cancel button 1306 to enable a user to abandon the task, a save button 1308 to enable a user to save the task status so far, and a next button 1310 to enable a user to complete the task/sub-task and move on to the next task/sub-task. The display 1300 is preferably a touch screen display.

FIG. 14 shows an example report generated by the system relating to a set of workflow tasks and sensor readings. Such a report may reflect the inputs to and outputs from a distributed behaviour model as previously described. Thus FIG. 14 illustrates a set of user tasks, including tasks involving collecting temperature sensor readings, and the results of evaluation of the tasks against a set of rules, including an indication as to whether or not corrective action is required. In a similar manner to the modelling of the behaviour of a device in the system, such a task list can, as previously described, be implemented using a distributed set of rules forming a model of the desired behaviour.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:
1. A cloud-based system for monitoring food processing, the system comprising:
   at least one fixed sensor for installation in an environment to be monitored, wherein the at least one fixed sensor is configured to collect fixed location environment data relating to the monitored environment;
   at least one handheld sensor for a user to collect mobile location environment data relating to the monitored environment;
   a remote monitoring and reporting system located remote to the monitored environment, to collect the fixed location environment data and the mobile location environment data from the at least one fixed sensor and the at least one handheld sensor respectively;
   a portable device comprising a processor configured to:
     receive the mobile location environment data from the at least one handheld sensor; and
     transmit a version of the received mobile location environment data to the remote monitoring and reporting system, wherein the version of the mobile location environment data is generated by the at least one handheld sensor and/or the portable device;
   a hub device for installation within the monitored environment, wherein the hub device comprises a processor configured to:
     receive fixed location environment data from the at least one fixed sensor; and
     transmit a version of the fixed location environment data to the remote monitoring and reporting system, wherein the version of the fixed location environment data is generated by the at least one fixed sensor and/or the hub device;
   wherein the monitoring and reporting system is configured to receive the version of the fixed location and mobile location environment data, to determine whether the version of the environment data indicates that the monitored environment is operating within the bounds of a model defining correct operation of a food process within the environment, and to output an alert if the version of the environment data indicates operation of said process within the monitored environment outside permitted bounds of said model;
   wherein the portable device comprises a display screen and is configured to display a task to prompt a user to collect mobile location environment data relating to the monitored environment; and the at least one handheld sensor comprises an identifier to indicate sensor type, wherein the at least one handheld sensor transmits the identifier to the portable device;

wherein the portable device processor is further configured to receive the identifier, and determine if the sensor type matches the sensor type required to perform the displayed task, wherein if the sensor type does not match, the portable device outputs a warning.

2. The cloud-based monitoring system as claimed in claim 1 including a mechanism for auditing said monitoring, wherein:

said processor of said portable device is configured to transmit an auditable version of the received mobile location environment data to the remote monitoring and reporting system, wherein the auditable version of the mobile location environment data is generated by the at least one handheld sensor and/or the portable device;

said processor of said hub device is configured to transmit an auditable version of the fixed location environment data to the remote monitoring and reporting system, wherein the auditable version of the fixed location environment data is generated by the at least one fixed sensor and/or the hub device;

said monitoring and reporting system is configured to:

receive the auditable version of the fixed location and mobile location environment data, to non-repudiably determine if the auditable version of the environment data indicates that the monitored environment is operating correctly, such that said monitoring and reporting system audits the collected data as coming from the at least one fixed sensor and the at least one handheld sensor; and to output an alert if the auditable version of the environment data indicates operation of said process within the monitored environment outside permitted bounds of said model;

wherein the auditable version of the mobile location environment data comprises a version processed using a secret value associated with the at least one handheld sensor, such that the auditable version of the mobile location environment data is verifiable as originating from the at least one handheld sensor; and wherein the auditable version of the fixed location environment data comprises a version processed using a secret value associated with the at least one fixed sensor, such that the auditable version of the fixed location environment data is verifiable as originating from the at least one fixed sensor.

3. The cloud-based monitoring system as claimed in claim 2 wherein the portable device generates the auditable version of the mobile location environment data by adding a timestamp to the received mobile location environment data, and wherein the hub device generates the auditable version of the fixed location environment data by adding a timestamp to the fixed mobile location environment data.

4. The cloud-based monitoring system as claimed in claim 2 wherein the portable device generates the auditable version of the mobile location environment data by adding a checksum to the received mobile location environment data, and wherein the hub device generates the auditable version of the fixed location environment data by adding a checksum to the fixed mobile location environment data.

5. The cloud-based monitoring system as claimed in claim 4 wherein the checksum is an MD5 checksum.

6. The cloud-based monitoring system as claimed in claim 2 wherein the auditable version of the fixed location environment data and the auditable version of the mobile location environment data is encrypted by the hub device and portable device respectively before being transmitted to the remote monitoring and reporting system.

7. The cloud-based monitoring system as claimed in claim 1 wherein the at least one handheld sensor transmits mobile location environment data to the portable device via Bluetooth, Wi-Fi, or ZigBee, and the at least one fixed sensor transmits fixed location environment data to the hub device via Bluetooth, Wi-Fi, or ZigBee.

8. The cloud-based monitoring system as claimed in claim 1 wherein the hub is configured to communicate using one or more of the Bluetooth, Wi-Fi and ZigBee communication protocols, and the hub processor is configured to optimise data transfer in the system by:

performing radio frequency scan and determine which radio frequency band is not in use; and selecting a radio frequency band to communicate with the at least one fixed sensor to reliably transfer data from the at least one fixed sensor to the hub.

9. The cloud-based monitoring system as claimed in claim 8 wherein the hub processor is further configured to output radio network configuration data defining a radio network configuration for optimising data transfer in the system.

10. The cloud-based monitoring system as claimed in claim 1 wherein the at least one fixed sensor is configured to collect the fixed location environment data relating to the monitored environment at regular intervals.

11. The cloud-based monitoring system as claimed in claim 1 wherein the at least one fixed sensor is configured to continuously collect the fixed location environment data relating to the monitored environment.

12. The cloud-based monitoring system as claimed in claim 1 wherein one or both of the at least one handheld sensor and the at least one fixed sensor is a humidity sensor or a temperature sensor.

13. The cloud-based monitoring system as claimed in claim 12 wherein the temperature sensor has a factory calibration defined by factory calibration data, and the system further comprises code to:

validate the temperature sensor by monitoring a deviation in the factory calibration over time by monitoring a sensed temperature of the temperature sensor in boiling water, wherein the monitoring of the deviation over time is performed for a substantially constant height of the temperature sensor above sea level; and storing or outputting sensor validation data dependent upon the validation.

14. The cloud-based monitoring system as claimed in claim 13 further comprising code to adjust the factory calibration by:

inputting a height above sea level of the temperature sensor;

inputting a reference sensed value from the temperature sensor when the temperature sensor is in boiling water at the inputted height;

adjusting the factory calibration dependent upon the reference sensed value and the inputted height.

15. The cloud-based monitoring system as claimed in claim 1 wherein the at least one fixed sensor senses whether a refrigerator or freezer door is open or closed.

16. The cloud-based monitoring system as claimed in claim 1 wherein the hub device and the portable device are configured to store the fixed location and mobile location environment data respectively, until the environment data has been received by the remote monitoring and reporting system.

\* \* \* \* \*